(12) United States Patent
Oishi et al.

(10) Patent No.: US 7,401,589 B2
(45) Date of Patent: Jul. 22, 2008

(54) ENGINE

(75) Inventors: Akifumi Oishi, Shizuoka-ken (JP); Yousuke Ishida, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/934,738

(22) Filed: Nov. 2, 2007

(65) Prior Publication Data
US 2008/0096718 A1   Apr. 24, 2008

Related U.S. Application Data

(63) Continuation of application No. 10/502,709, filed as application No. PCT/JP03/04467 on Apr. 8, 2003, now abandoned.

(30) Foreign Application Priority Data

Apr. 8, 2002   (JP) .............................. 2002-105025

(51) Int. Cl.
*F01M 1/02*   (2006.01)
(52) U.S. Cl. ..................... 123/196 R; 474/13
(58) Field of Classification Search ................ None
See application file for complete search history.

(56) References Cited

U.S. PATENT DOCUMENTS

| | | | |
|---|---|---|---|
| 3,212,348 A | 10/1965 | Atsumi | |
| 4,593,785 A | 6/1986 | Yamamoto et al. | |
| 5,960,761 A | 10/1999 | Kawakubo et al. | |
| 6,305,337 B1 | 10/2001 | Sumi et al. | |
| 6,497,211 B2 | 12/2002 | Nomura et al. | |
| 6,758,197 B2 | 7/2004 | Korenjak et al. | |

FOREIGN PATENT DOCUMENTS

| | | |
|---|---|---|
| EP | 0298791 | 1/1989 |
| JP | 05213262 | 8/1993 |
| JP | 09250320 | 9/1997 |

*Primary Examiner*—Stephen K. Cronin
*Assistant Examiner*—Hyder Ali
(74) *Attorney, Agent, or Firm*—Hogan & Hartson LLP

(57) ABSTRACT

An engine comprises: a V-belt type continuously variable transmission on one side of an engine case, said CVT being provided with and housing in a transmission case a drive pulley attached to one end of a crankshaft, a driven pulley attached to one end of a transmission shaft parallel to said crankshaft, a V-belt routed around the pulleys, said engine case supporting said crankshaft and transmission shaft in a rotatable manner, and a generator attached to the opposite end of said crankshaft in said engine case; in which a filter chamber is disposed in the opposite side surface of said transmission case of said engine case in a depressed manner so as to overlap with at least a part of said generator in the crankshaft direction, and an oil filter for filtering lubricating oil is disposed in said filter chamber.

19 Claims, 17 Drawing Sheets

At standstill
Oil level
MAX
MIN

ENGINE

CROSS-REFERENCE TO RELATED APPLICATIONS

This application is a continuation of application Ser. No. 10/502,709, filed Jul. 26, 2004, which is a national phase of PCT/JP03/04467, filed Apr. 8, 2003, and claims the benefit under 35 USC 119 of Japanese patent application serial no. 2002-105025, filed on Apr. 8, 2002, which applications are hereby incorporated by reference in their entireties.

BACKGROUND OF THE INVENTION

1. Field of the Invention

The present invention relates to an engine appropriate for use, for example, on motorcycles, and more particularly to an engine with a transmission case housing a V-belt type of continuously variable transmission (CVT) on one side in the crankshaft direction of the engine case.

2. Technical Background

Some of the engines for use on motorcycles, for example, are provided with a CVT located on the axially outer side of the engine case and housing a V-belt type of CVT mechanism in a transmission case. In the engine described as above, since the transmission case occupies one side of the engine case, a problem of increased lateral and longitudinal engine dimensions may occur depending on the arrangement of engine accessories such as parts constituting the lubricating and starting systems.

A conventional type of engine with a V-belt type of CVT has an arrangement of the oil filter, for example, constituting the lubricating system where the oil filter is removably attached to and protruding on the side wall of the engine case. A conventional arrangement of the kick shaft constituting the starting system is that the kick shaft is located on the opposite side of the transmission case and between a drive and a driven pulley. However, the arrangement of the oil filter described above has a problem of increased lateral and longitudinal engine dimensions since the oil filter protrudes forward from the front wall of the engine case or laterally from the side wall.

Additionally, the arrangement of the kick shaft described above has a problem of increased lateral engine dimension, because the mechanism for transmitting the rotation of the kick shaft to the crankshaft is disposed on the outer side of the generator of the engine case in the lateral direction.

A feature of the present invention made in view of the situations with the prior art described above is to provide an engine capable of avoiding an increase in engine size in the longitudinal and lateral directions in case the transmission case is provided on one side of the engine case.

SUMMARY OF THE INVENTION

The invention according to one embodiment of the present invention includes a V-belt type continuously variable transmission on one side of an engine case. The CVT is provided with and housed in a transmission case, a drive pulley attached to one end of a crankshaft, a driven pulley attached to one end of a transmission shaft parallel to the crankshaft, and a V-belt routed around the pulleys. The engine case supports the crankshaft and transmission shaft in a rotatable manner. A generator is attached to the opposite end of the crankshaft in the engine case. A filter chamber is provided on the opposite side surface of the transmission case of the engine case in a depressed manner so as to overlap with at least a part of the generator in the crankshaft direction. An oil filter for filtering lubricating oil is disposed in the filter chamber.

The "engine case" as used herein is a general term including the following cases: the crankcase in which the crankshaft is placed, the clutch case in which the clutch mechanism is housed, and the generator case in which the generator is placed. Each case is formed partially or entirely to be integral with the other case or cases, or separately formed.

According to an embodiment of the present invention, the filter chamber is located below the first plane including the axes of the crankshaft and the transmission shaft.

The filter chamber is also located between the second plane orthogonal to the first plane and including the axis of the crankshaft and the third plane orthogonal to the first plane and including the axis of the transmission shaft.

A clutch mechanism is attached to the transmission shaft. The clutch mechanism overlaps at least in part with a crank arm of the crankshaft in the crankshaft direction. The axis of the filter chamber is located adjacent to the bottom edge of the clutch mechanism, and the filter chamber is separated from the clutch mechanism in the crankshaft direction.

According to an embodiment of the present invention, an exhaust pipe is connected to an exhaust opening of a cylinder connected to the engine case and passing below the transmission case and along the side of the bottom of the engine ease to extend in the backward direction of the vehicle.

A lubricant oil chamber for collecting the lubricating oil is disposed below a crank chamber and shifted to the side of the transmission case, and at least a part of the filter chamber overlaps with the lubricant oil chamber as seen in the crankshaft direction.

A kick shaft is placed on the opposite side of the transmission case and parallel to the crankshaft and positioned, as seen in the crankshaft direction, below the transmission shaft and an output shaft in order to overlap with at least one of the driven pulley or the clutch mechanism.

The transmission shaft and the output shaft are coaxially disposed, and the kick shaft is located approximately directly below the output shaft and overlaps with both the driven pulley and the clutch mechanism.

According to an embodiment of the present invention, a kick gear attached to the kick shaft is capable of engaging with the first intermediate gear attached to one end of an intermediate shaft, the second intermediate gear attached to the opposite end of the intermediate shaft is capable of engaging with a crank gear attached to the crankshaft, the kick gear and the first intermediate gear are disposed in the inner side of a support wall portion for supporting a journal portion on the opposite side of the transmission case of the crankshaft, and the second intermediate gear and the crank gear are disposed on the outer side of the support wall portion.

The center of the lubricant oil chamber for collecting the lubricating oil in the crankshaft direction is disposed to be shifted to the side of the transmission case from the engine center line passing through a cylinder axis line. At least one of a series of kick gears for transmitting the rotation of the kick shaft to the crankshaft, a series of pump gears for transmitting the rotation of the crankshaft to a lubricant oil pump, a series of starting gears for transmitting the rotation of a starter to the crankshaft, and a series of balancer gears for transmitting the rotation of the crankshaft to a balancer shaft is disposed to be shifted to the opposite side of the transmission case from the lubricant oil chamber of the engine case.

The side wall of the lubricant oil chamber on the opposite side of the transmission case is constituted of a support wall portion for supporting a journal portion on the opposite side of the transmission case of the crankshaft and at least one of the series of kick gears, the series of pump gears, the series of starting gears, and the series of balancer gears is disposed along the support wall portion for supporting the opposite side.

The lubricant oil chamber is located in an area from the lower part of the crank chamber of the engine case to the lower part of the transmission case.

According to an embodiment of the present invention, the generator is attached to the end of the crankshaft opposite to the transmission case, and at least one of the series of kick gears, the series of pump gears, the series of starting gears, and the series of balancer gears passes between the generator and the support wall portion and is connected to said crankshaft.

The filter chamber is disposed in a depressed manner on the side surface of the engine case opposite to the transmission case so as to overlap at least in part with the generator attached to the end of the crankshaft opposite to the transmission case and the oil filter for filtering the lubricant oil is provided in the filter chamber.

At least a part of the filter chamber overlaps with any one of the series of gears as seen in the crankshaft direction.

The series of kick gears is constituted that the kick gear attached to the kick shaft is capable of engaging with the first intermediate gear attached to one end of an intermediate shaft. The second intermediate gear attached on the opposite end of the intermediate shaft is capable of engaging with the crank gear attached to the crankshaft, the kick gear and the first intermediate gear are disposed in the inner side of the support wall portion and the second intermediate gear and the crank gear are disposed on the outer side of said support wall portion.

According to an embodiment of the present invention, the series of pump gears is constituted to transmit the rotation of the crank gear attached between the support wall portion of the crankshaft and the generator to the pump gear through an intermediate gear. The pump gears are attached to a rotational shaft of the lubricant oil pump attached to the portion of the support wall portion constituting the side wall of the lubricant oil chamber.

DETAILED DESCRIPTION OF THE INVENTION

The embodiments of the present invention will be hereinafter described in reference to the appended drawings.

Figure 1:
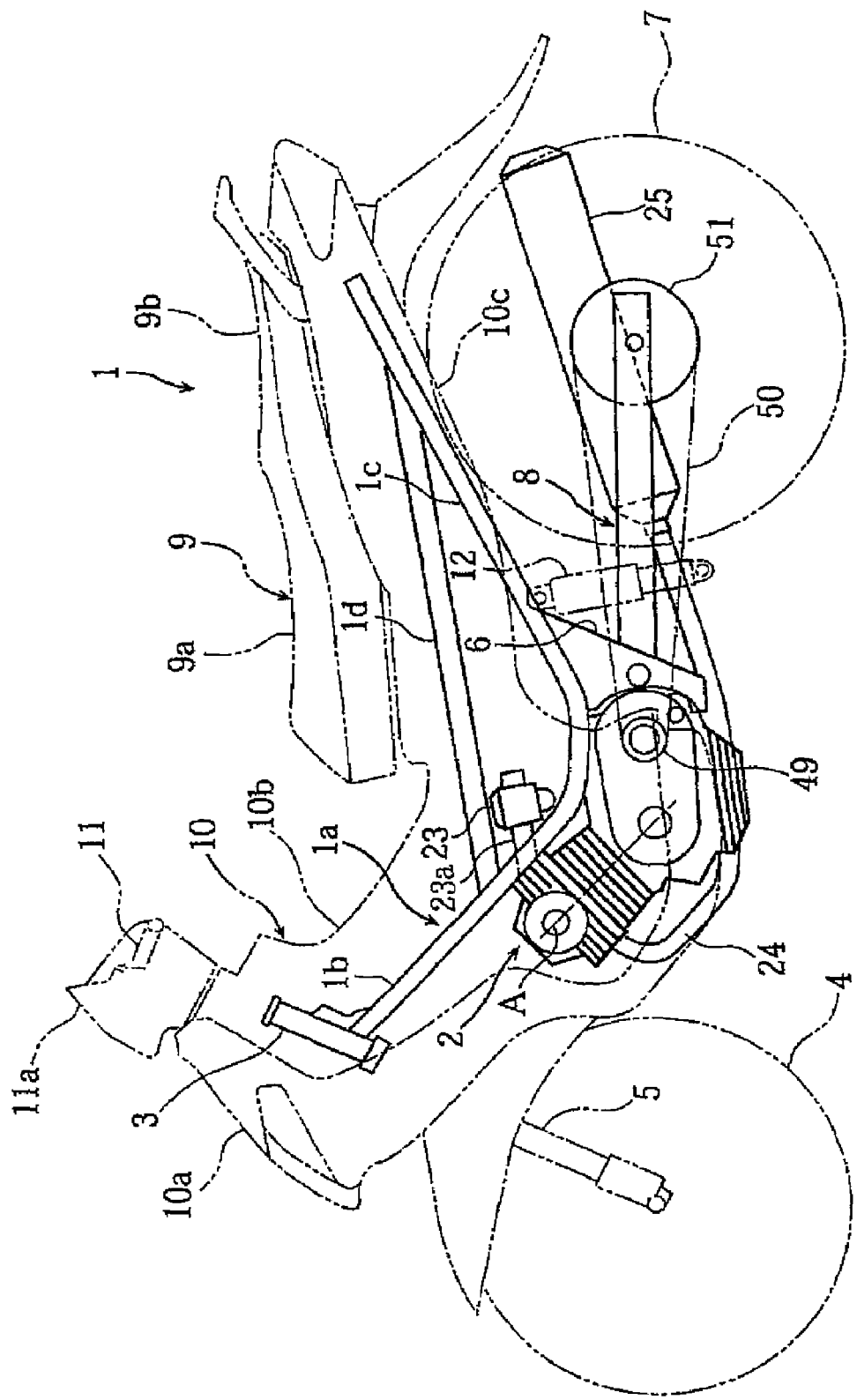
FIG. 1 is a left side view of a motorcycle on which an engine as an embodiment of the present invention is mounted.
Figure 2:
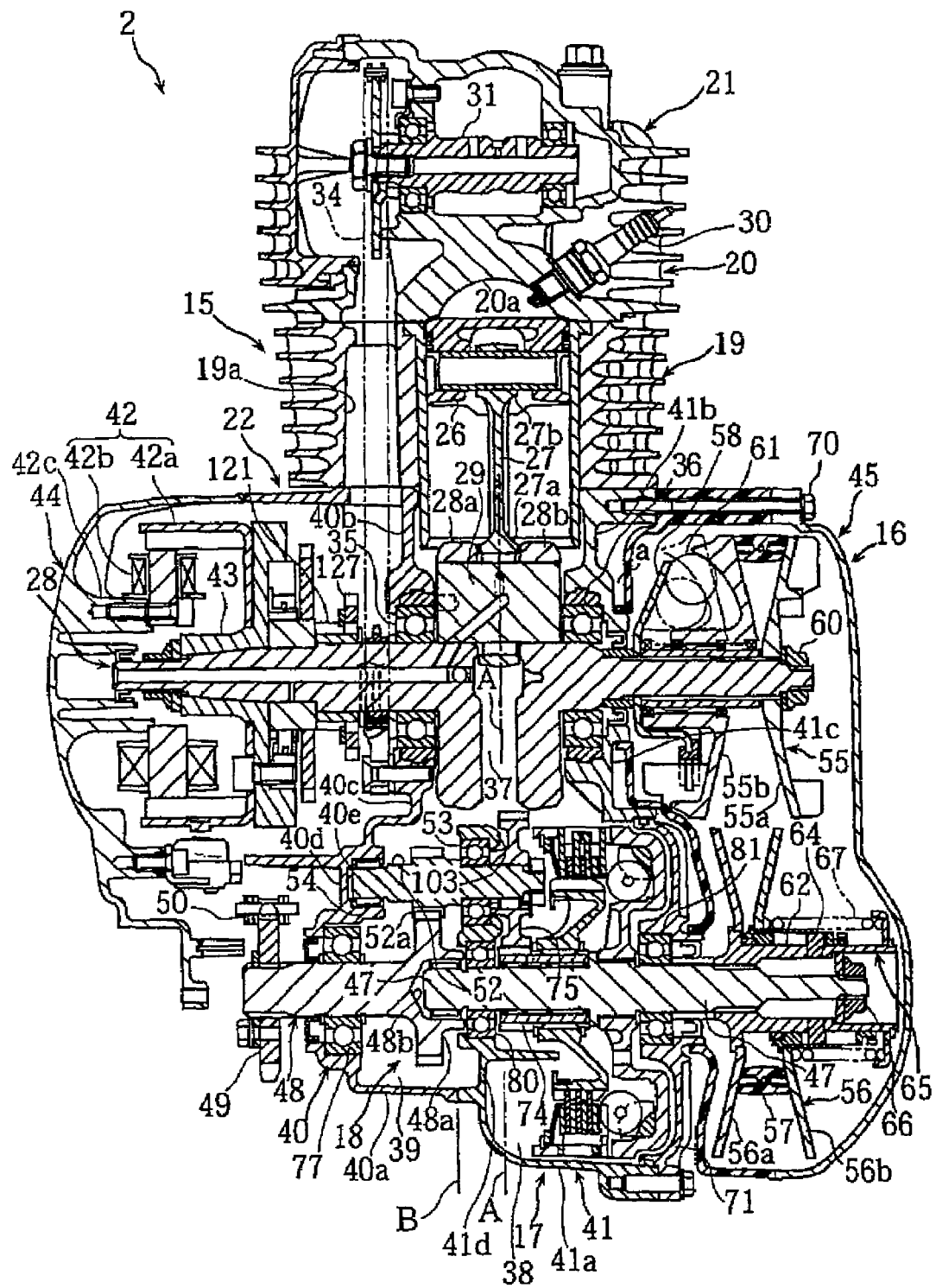
FIG. 2 is a sectional plan view extended along the line II-II in FIG. 6 of the above engine.
Figure 3:
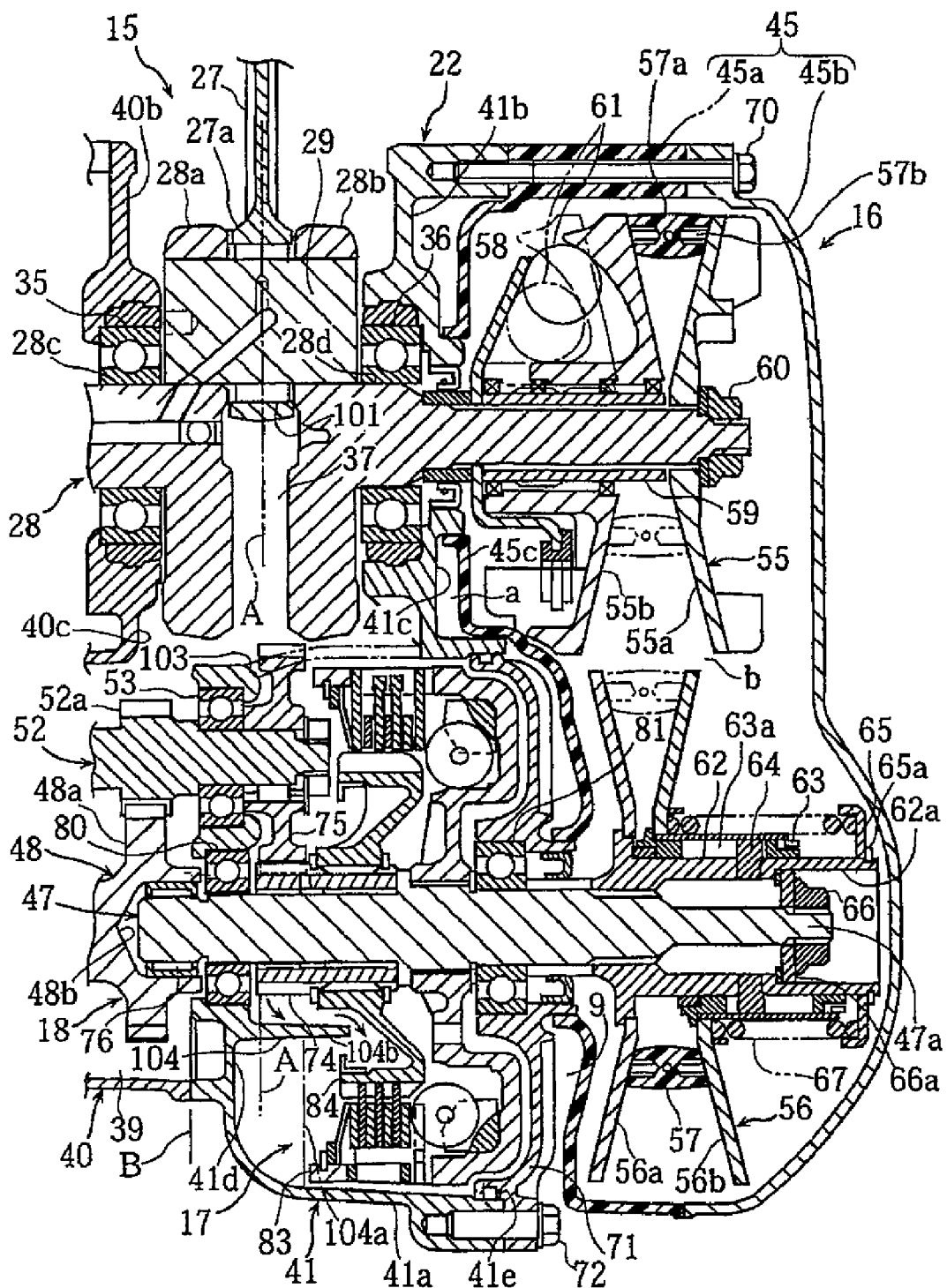
FIG. 3 is a sectional plan view of the CVT mechanism and the centrifugal clutch mechanism portion of the above engine.
Figure 4:
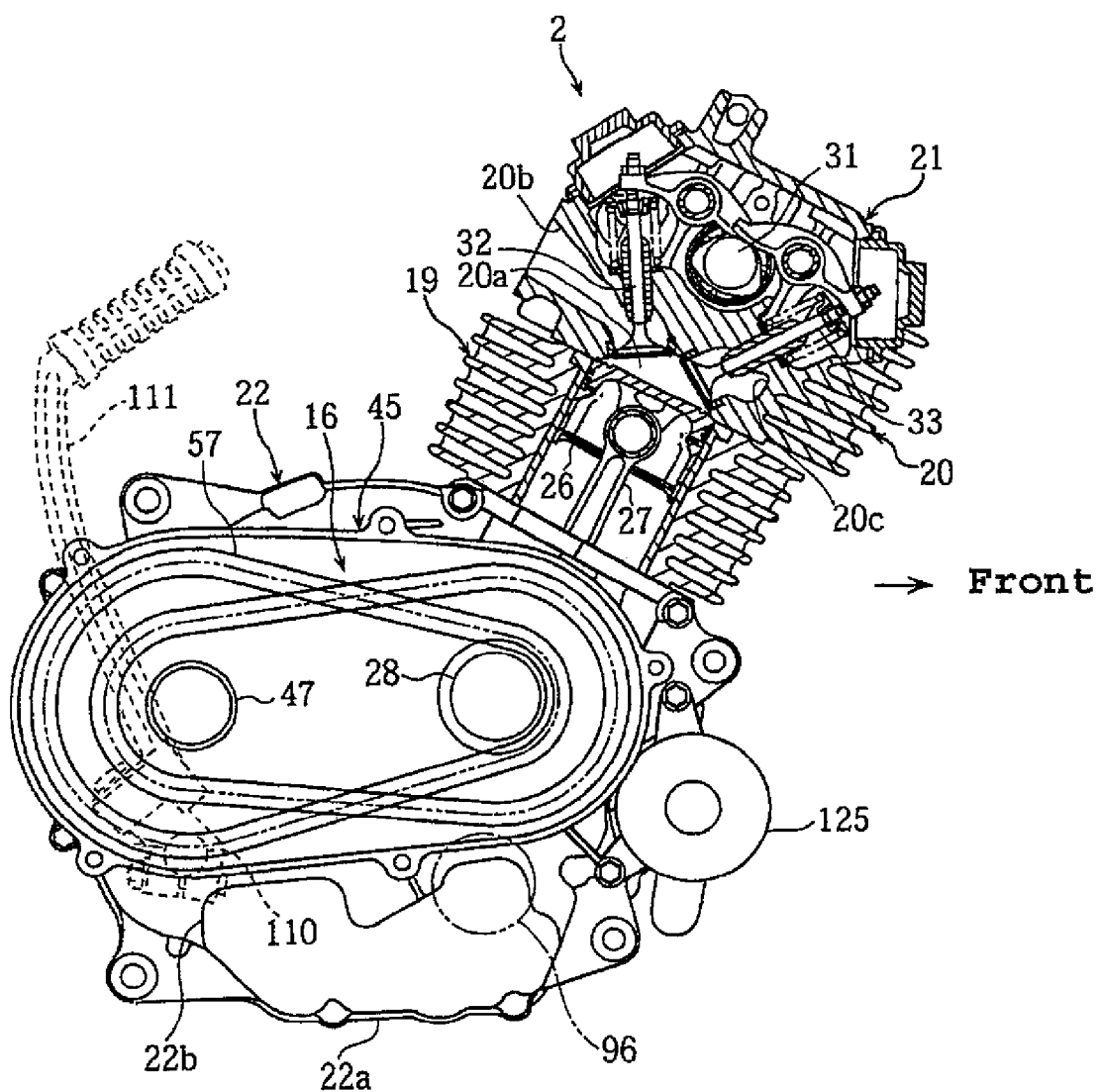
FIG. 4 is a right side view of the above engine.
Figure 5:
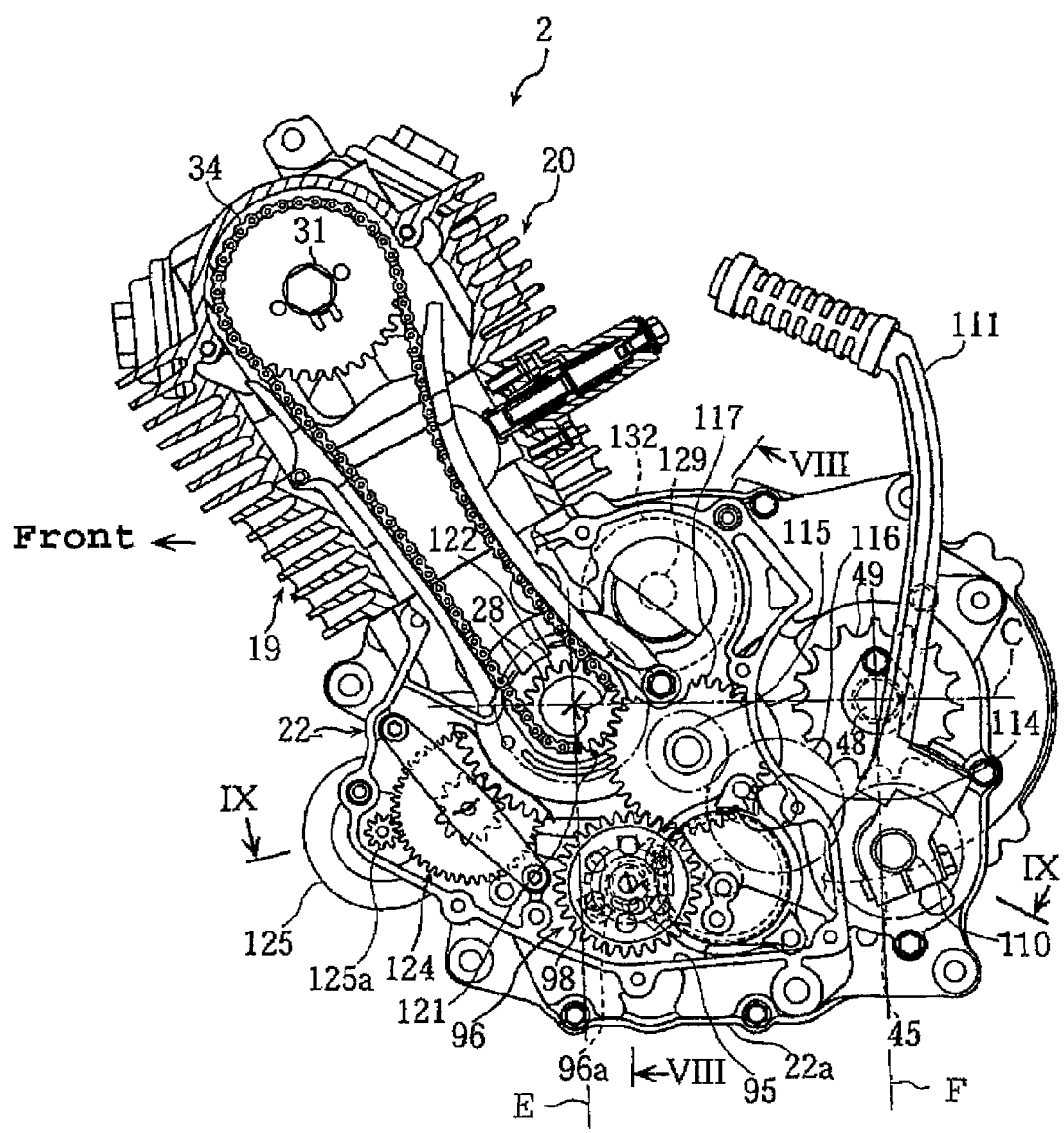
FIG. 5 is a left side view of the above engine.
Figure 6:
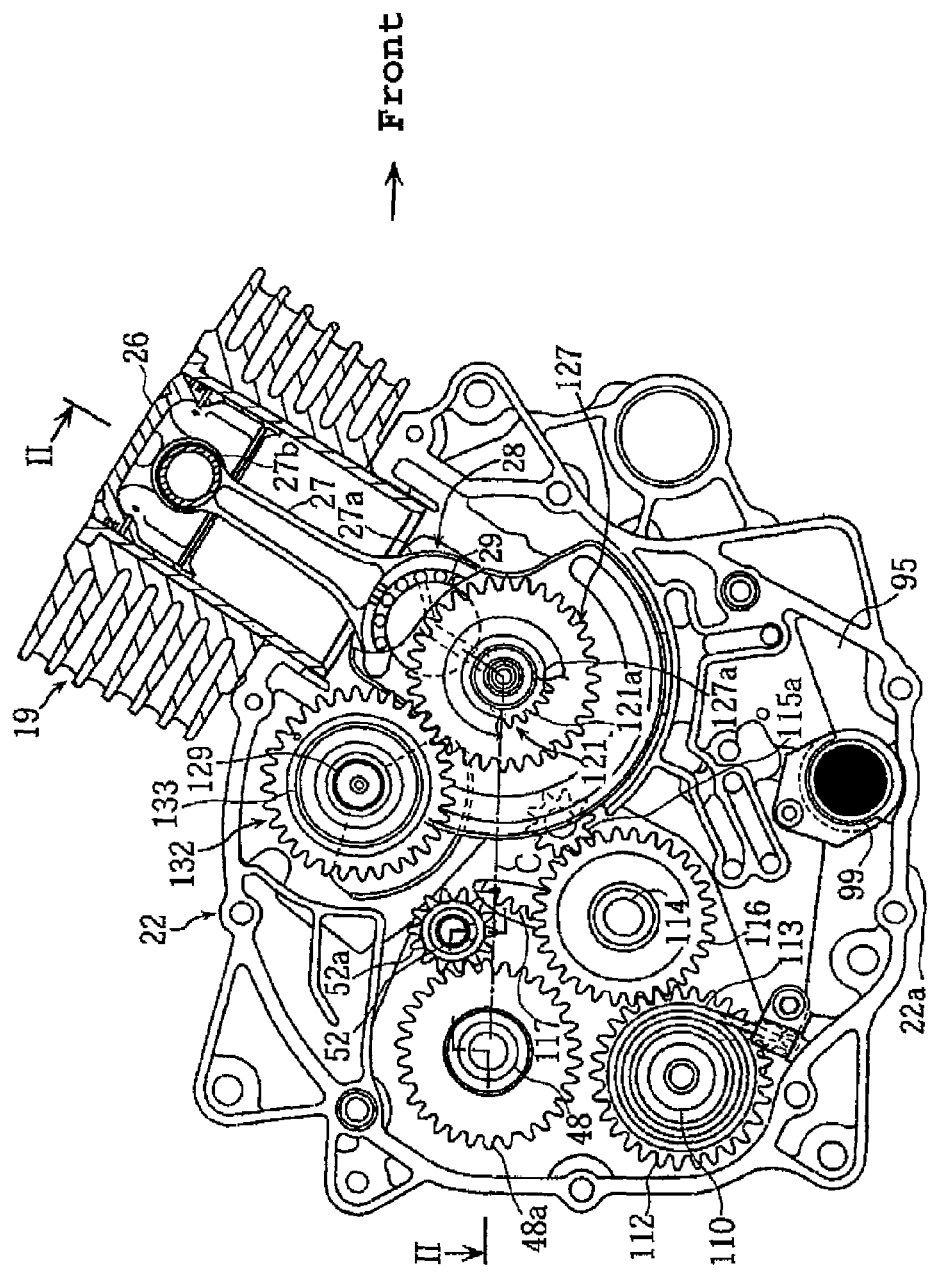
FIG. 6 is a right side view of the above engine with the CVT mechanism and the centrifugal clutch mechanism removed.
Figure 7:
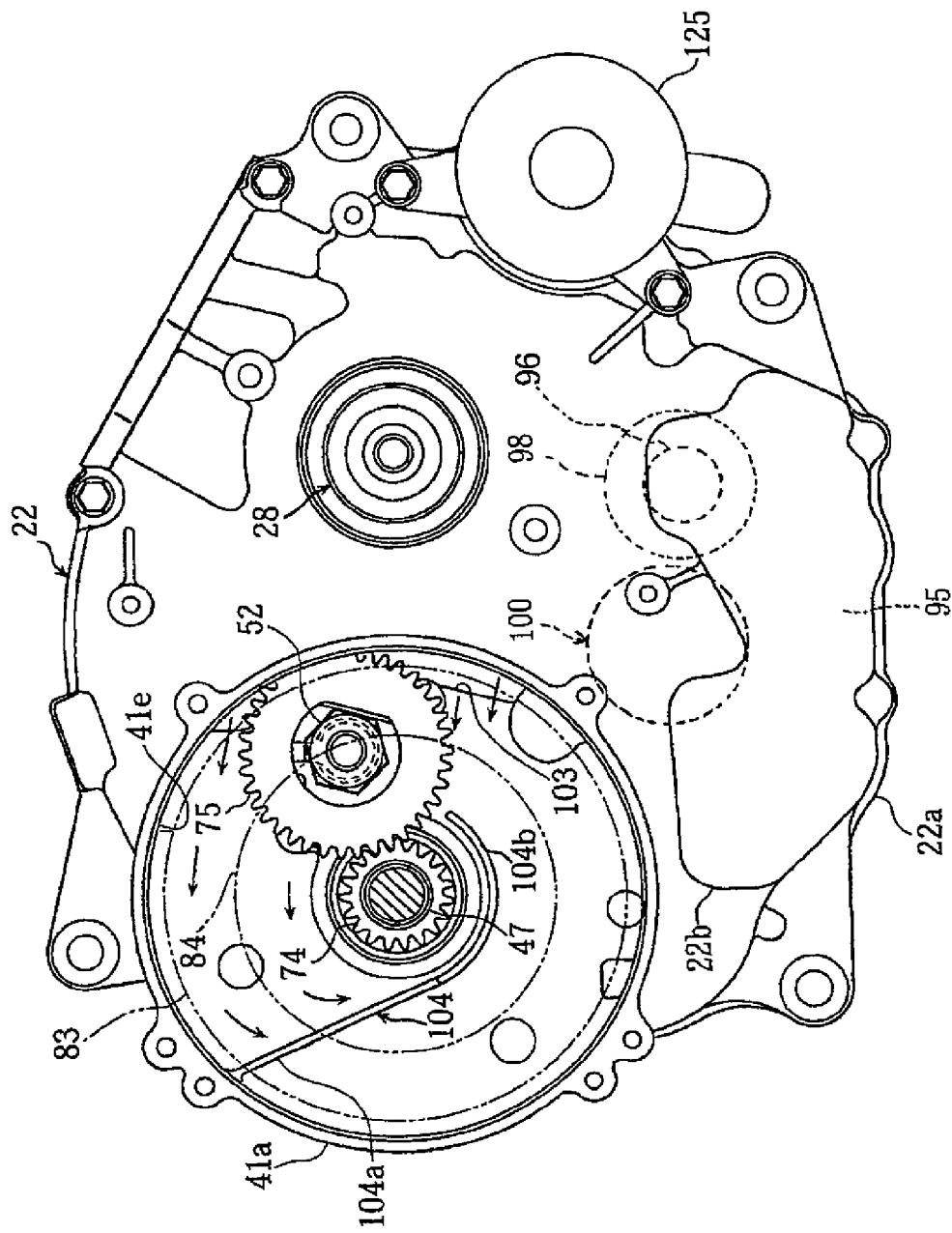
FIG. 7 is a right side view of the crankcase of the above engine.
Figure 8:
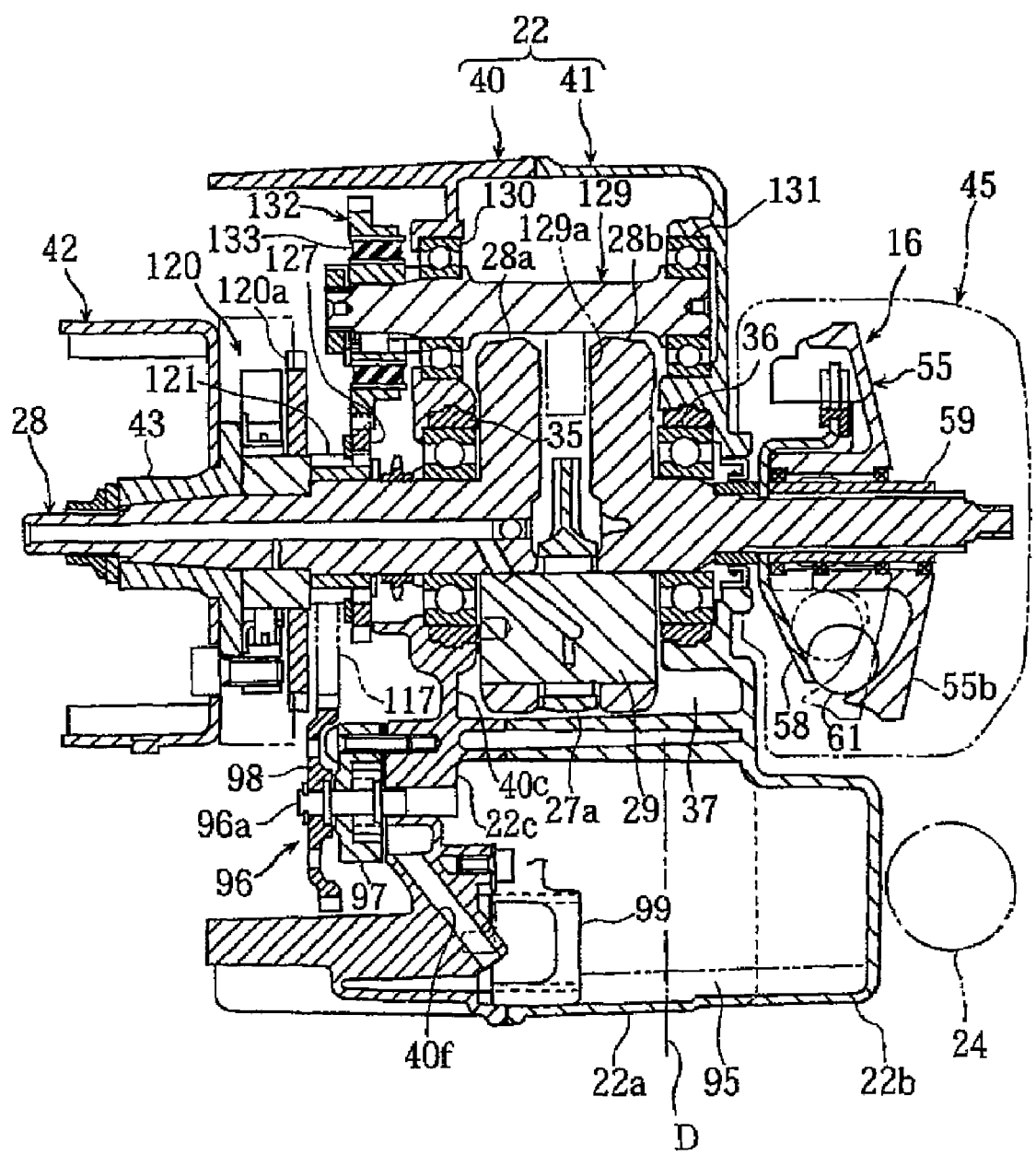
FIG. 8 is a sectional rear view along the line VIII-VIII in FIG. 5 of the above crankcase.
Figure 9:
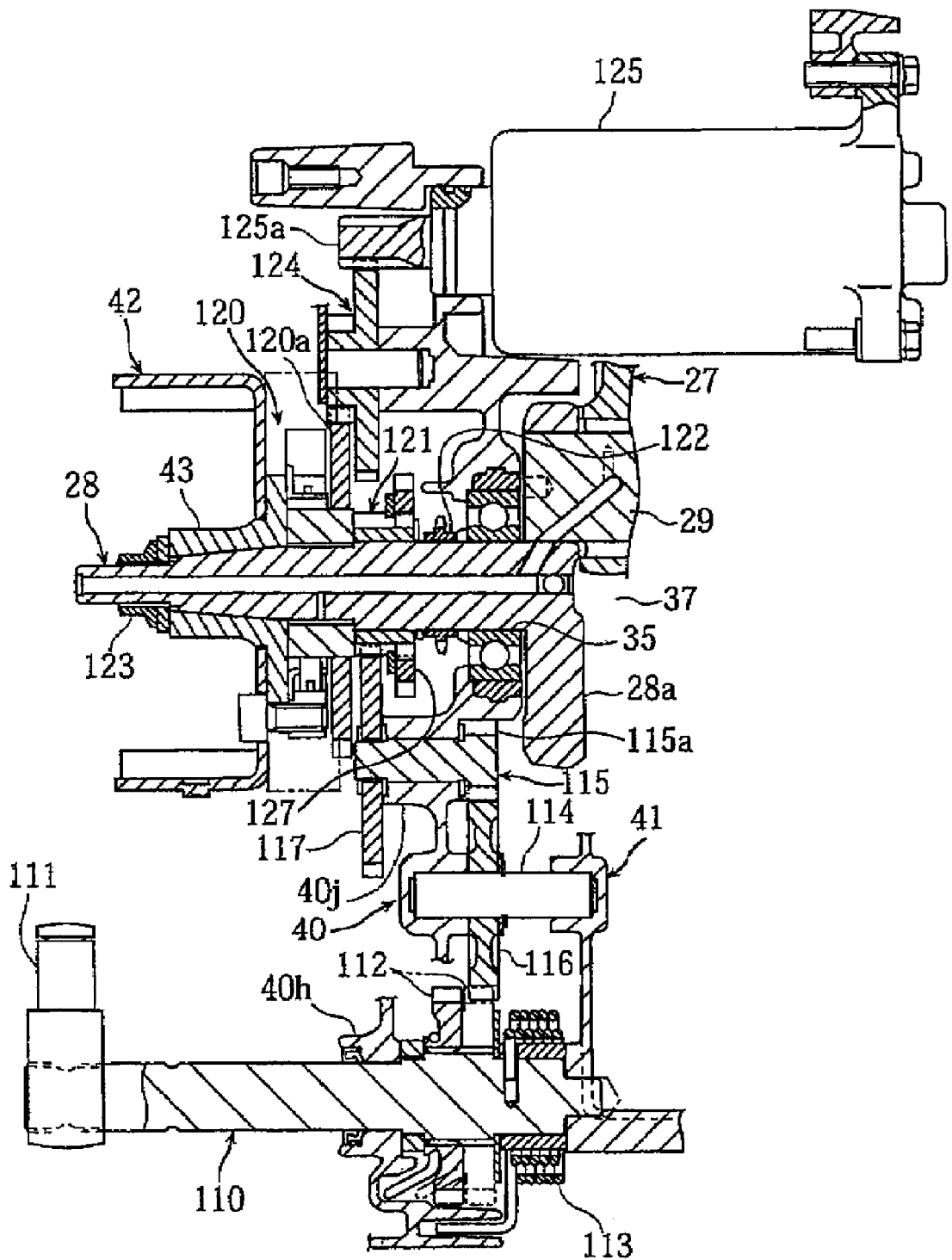
FIG. 9 is a sectional plan view along the line IX-IX in FIG. 5 of the kick mechanism of the above engine
Figure 10:
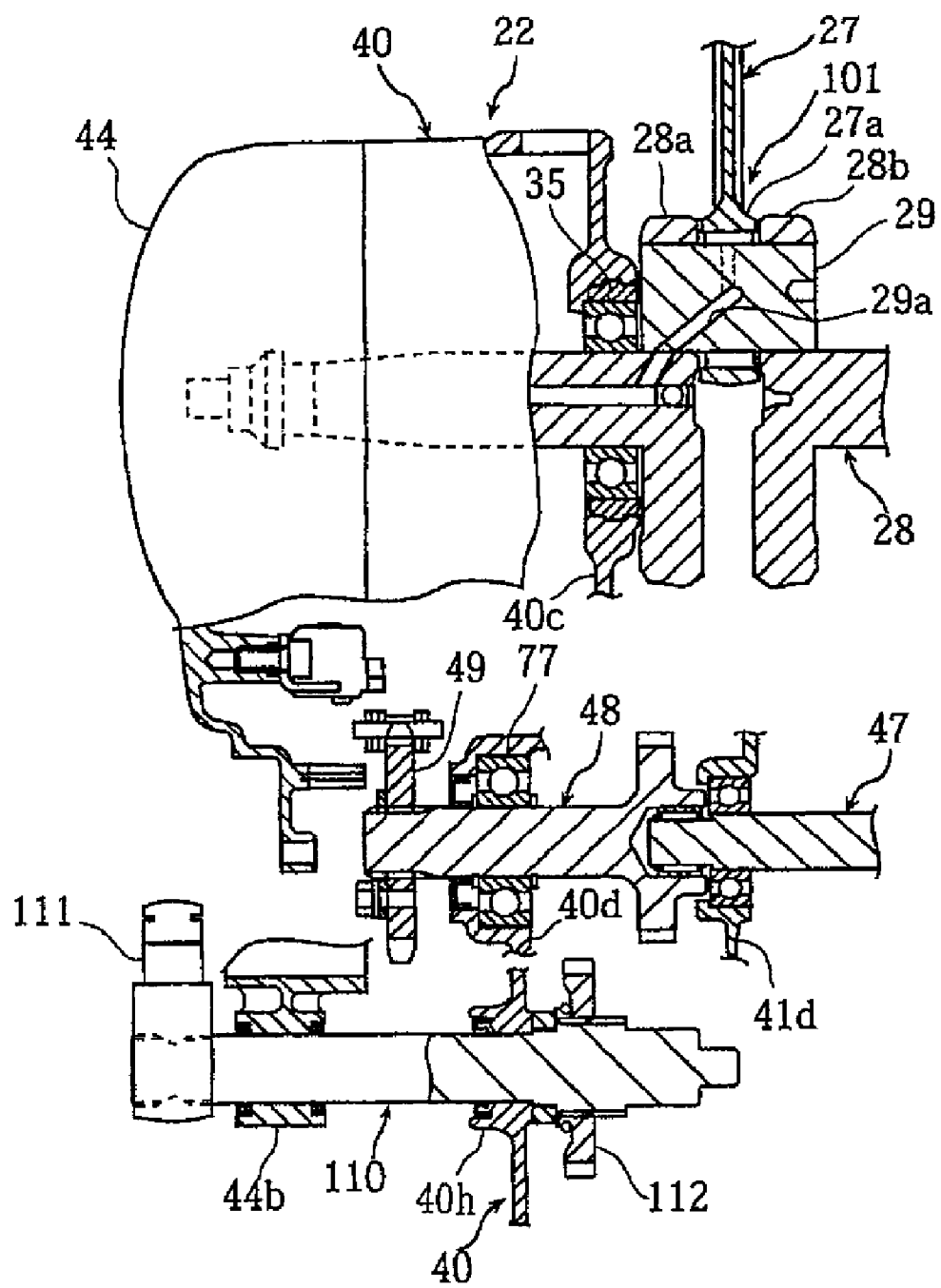
FIG. 10 is a sectional rear view of the above kick mechanism.
Figure 11:
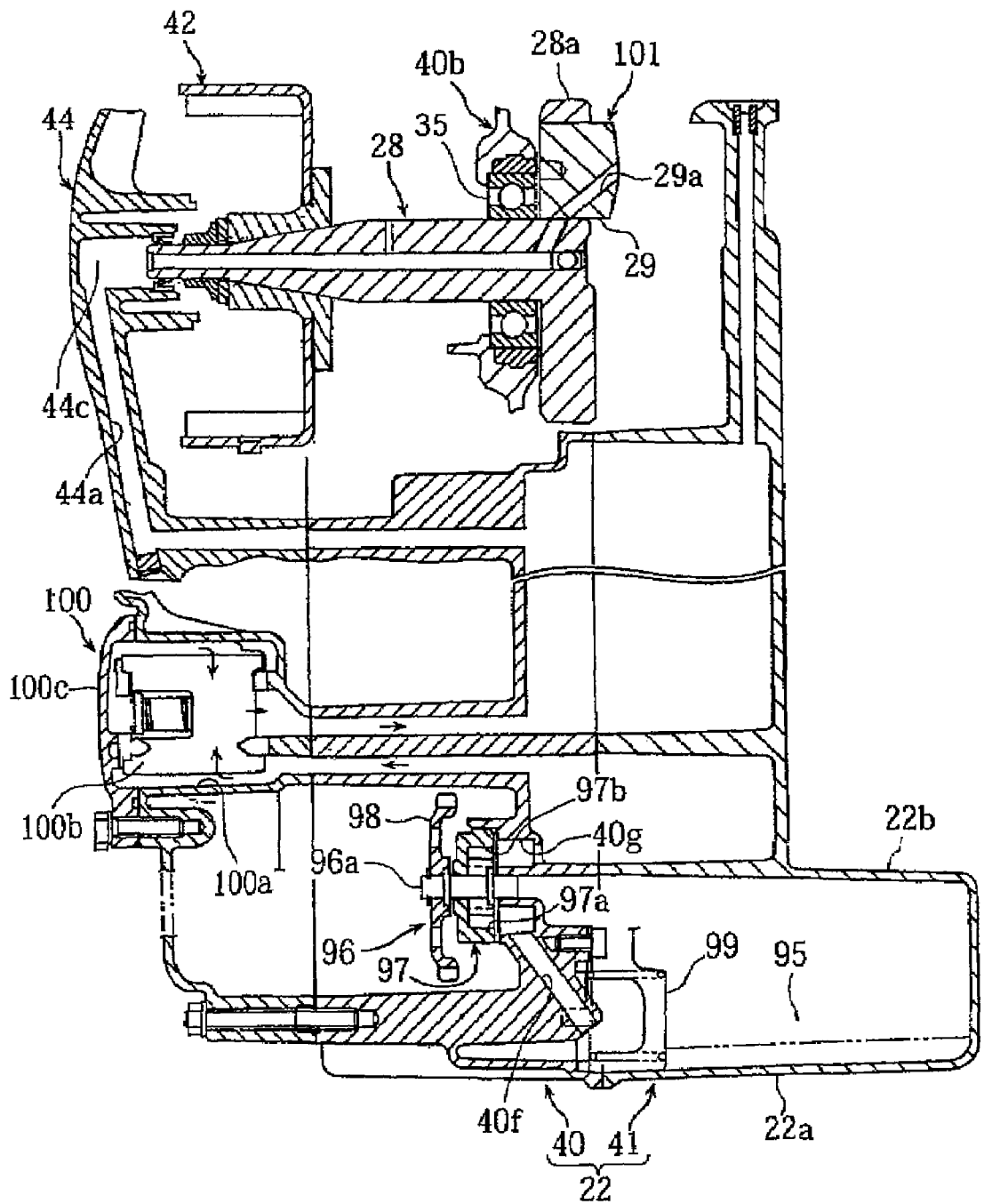
FIG. 11 is a sectional rear view showing the lubricant oil path of the above engine.
Figure 12:
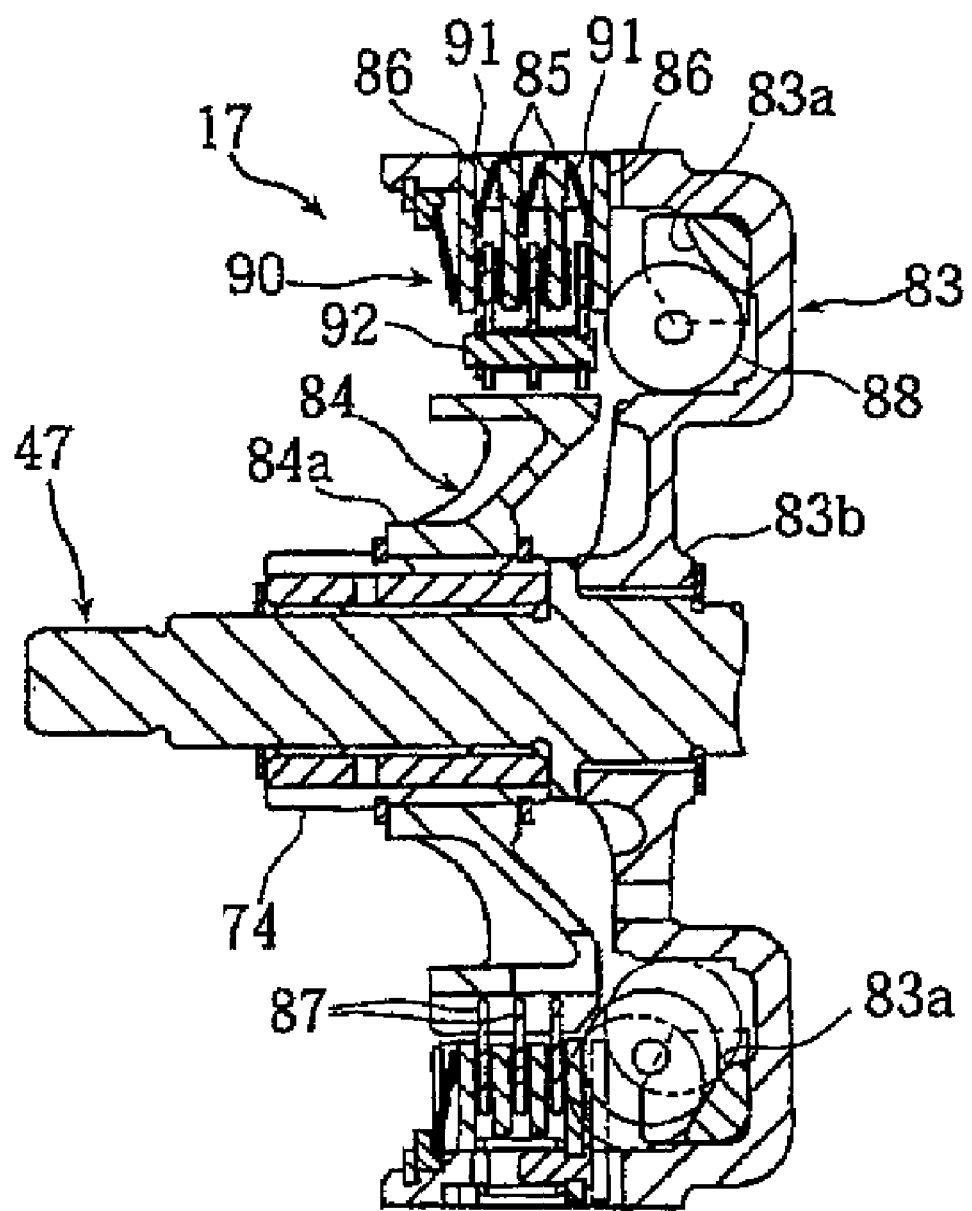
FIG. 12 is a sectional view of the above centrifugal clutch.
Figure 13:
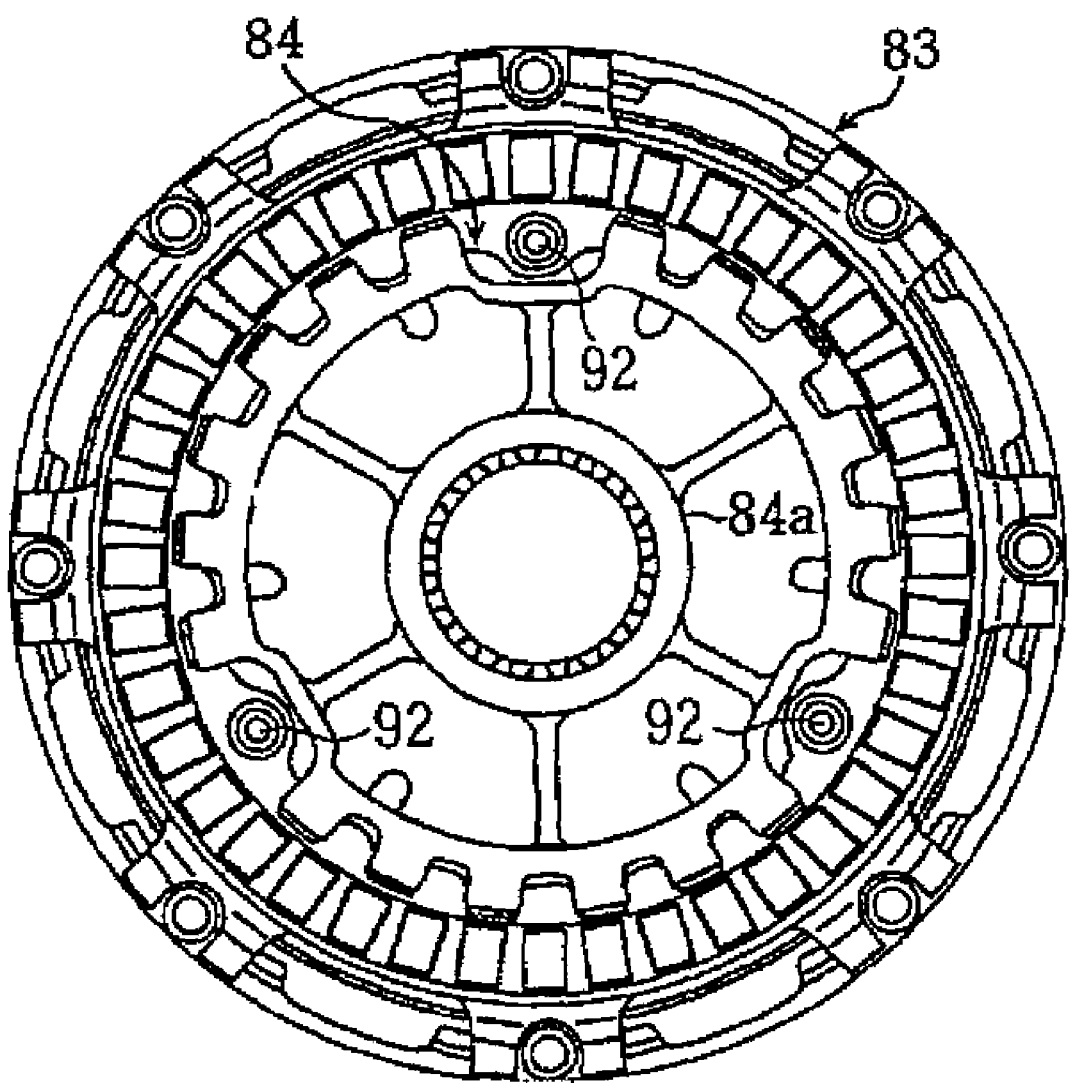
FIG. 13 is a side view of the above centrifugal clutch.
Figure 14:
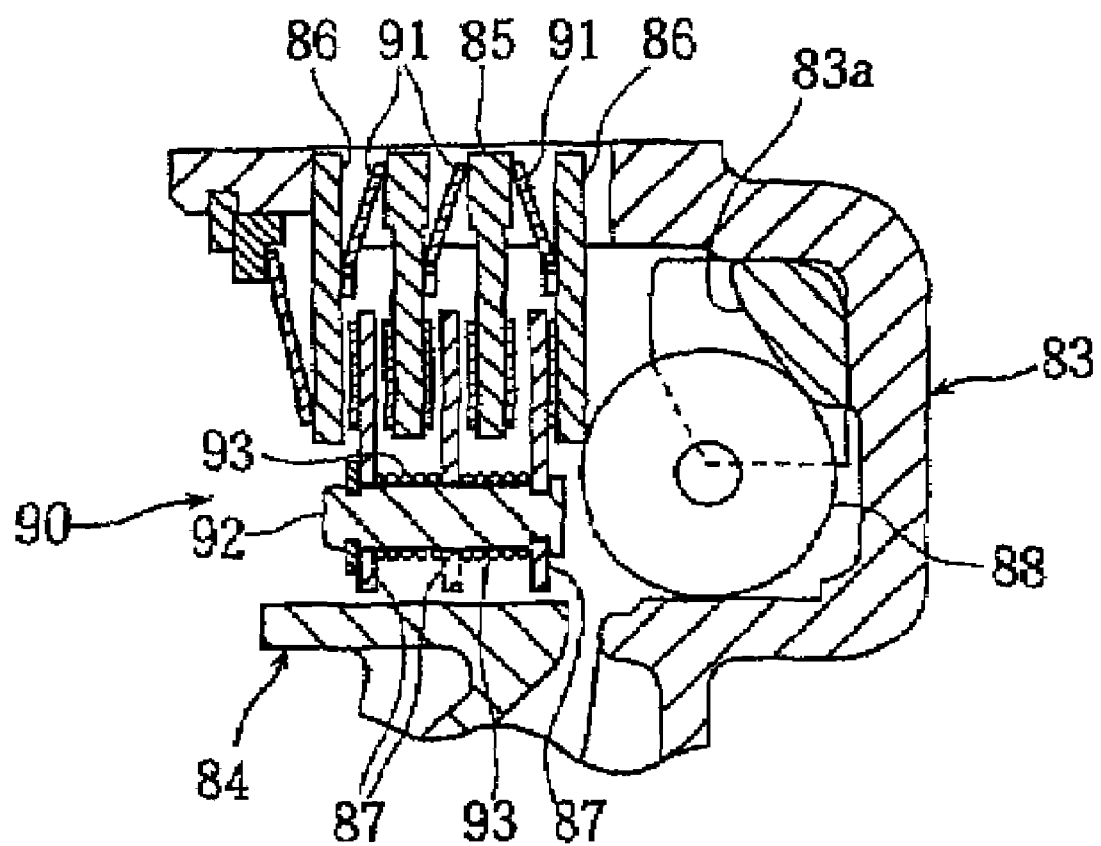
FIG. 14 is an enlarged sectional view of an essential part of the above centrifugal clutch.
Figure 15:
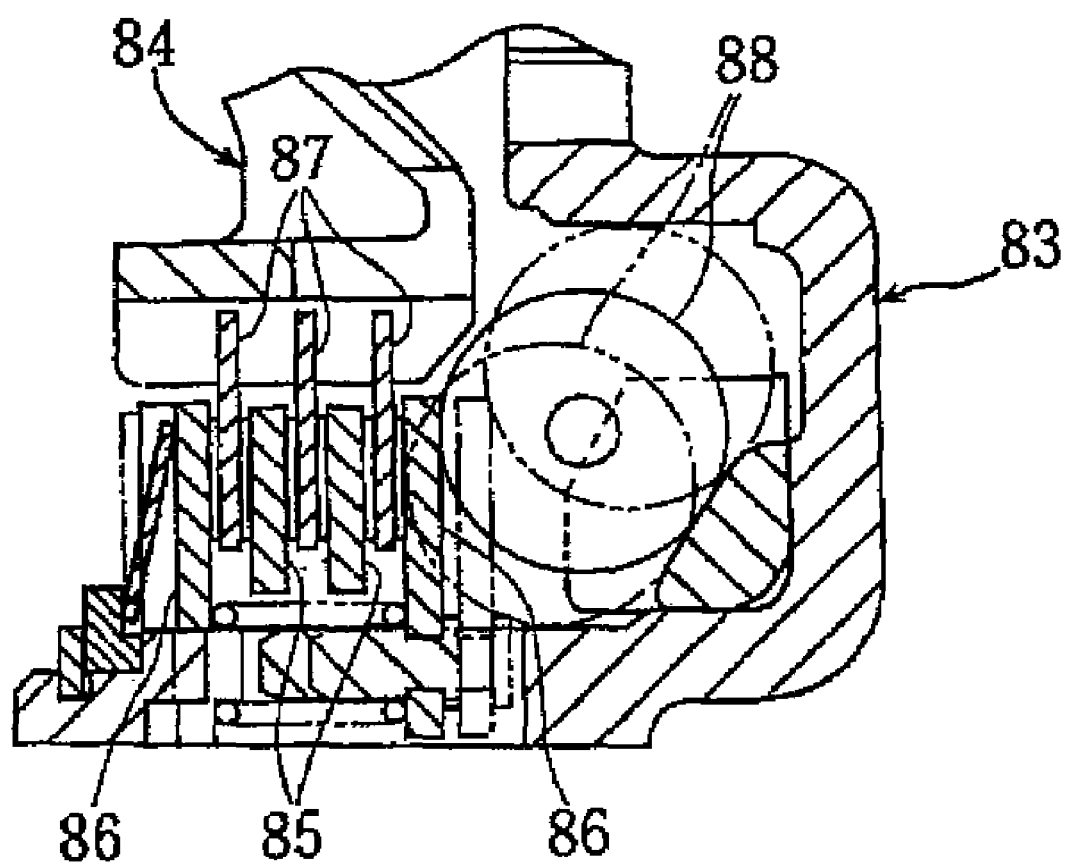
FIG. 15 is an enlarged sectional view of an essential part of the above centrifugal clutch.
Figure 16:
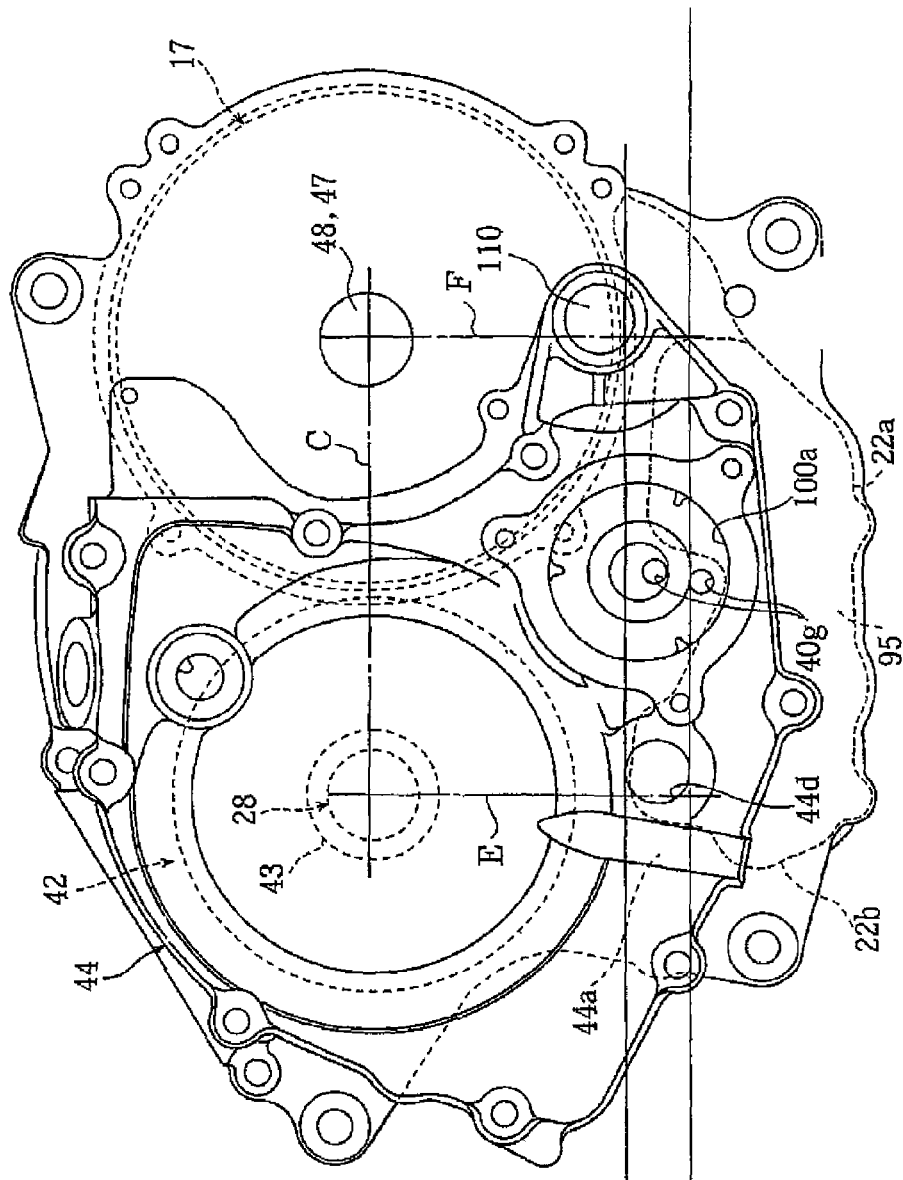
FIG. 16 is a left side view of the above crankcase.

FIGS. 1 to 16 are explaining a motorcycle engine as an embodiment of the present invention, FIG. 1 is a left side view of a motorcycle on which an engine as an embodiment of the present invention is mounted. FIG. 2 is a sectional plan view along the line II-II in FIG. 6 showing the extended state of the above engine. FIG. 3 is a sectional plan view of the CVT mechanism and the centrifugal clutch mechanism portion of the above engine. FIGS. 4 and 5 are right and left side views of the engine. FIG. 6 is a right side view of the above engine with the CVT mechanism and the centrifugal clutch mechanism removed. FIG. 7 is a right side view of the crankcase of the above engine. FIG. 8 is a sectional rear view along the line VIII-VIII in FIG. 5 of the above crankcase. FIG. 9 is a sectional view of the kick mechanism of the above engine as seen along the line IX-IX in FIG. 5. FIG. 10 is a sectional plan view around the kick shaft. FIG. 11 is a sectional rear view of the lubricant oil path of the above engine. FIGS. 12 and 13 are sectional and side views of the above centrifugal clutch mechanism. FIGS. 14 and 15 are enlarged sectional views of an essential part of the above centrifugal clutch. FIG. 16 is a left side view of the above crankcase. Incidentally, the terms "right" and "left" as used herein are meant as seen from the rider seated on the seat.

To roughly describe the constitution of a motorcycle 1 shown in the drawings, an engine 2 of this embodiment is mounted on the motorcycle 1, a head pipe 3 is secured to the front end of a vehicle body frame 1a to support a front fork 5 that is capable of turning right and left about its axis and supports a front wheel 4 with a shaft, a rear arm bracket 6 secured to the central part of the vehicle frame 1a to support a rear arm 8 which supports a rear wheel 7 with a shaft for up and down swinging, and a seat 9 made up of a front rider's seat 9a and a rear rider's seat 9b is mounted on the vehicle body frame 1a.

The vehicle body frame 1a is made up of right and left down tubes 1b extending from the head pipe 3 obliquely rear downward, right and left upper tubes 1c extending from the rear ends of the down tubes 1b obliquely rear upward, and right and left seat rails 1d extending in the longitudinal direction of the vehicle to interconnect the down tubes 1b and upper tubes 1c.

The vehicle body frame 1a is surrounded with a resinous vehicle body cover 10 made up of a front cover 10a, a leg shield 10b, and a side cover 10c.

Steering handlebars 11 are secured to the upper end of the front fork 5 and surrounded with a handlebar cover 11a. A rear damper 12 is suspended between the rear arm 8 and the rear arm bracket 6.

The engine 2 is an air-cooled, four-stroke, single cylinder engine and suspension-supported between rear lower parts of the down tubes 1b, with its cylinder axis tilted forward by about 45 degrees. The engine 2 includes an engine unit 15 and a V-belt type of CVT 16, and the engine case of the engine unit 15 houses a wet type, multi-plate, centrifugal clutch mechanism 17 and a reduction gear mechanism 18.

The engine unit 15, in rough description, is constituted with a cylinder block 19, a cylinder head 20 placed on the top mating surface of the cylinder block 19, a head cover 21 placed over the cylinder head 20, a crankcase 22 attached to the bottom mating surface of the cylinder block 19 to house a crankshaft 28, and a generator case 44 attached on the left side of the crankcase 22. The engine case of this embodiment is made up of the crankcase 22 and the generator case 44.

The rear surface of the cylinder head 20 is provided with an intake port 20b connected to a combustion recess 20a. The intake port 20b is connected through an intake pipe 23a to a carburetor 23. The front surface of the cylinder head 20 is provided with an exhaust port 20c connected to the combustion recess 20a. An exhaust pipe 24 is connected to the exhaust port 20c. The exhaust pipe 24 extends obliquely toward the right lower side of the engine, along under the transmission case 45 (to be described later) and the right side of a swelled portion 22b of a lubricant oil chamber, and obliquely rearward along the vehicle body and is connected to a muffler 25 disposed on the right side of the rear wheel 7. In the combustion recess 20a is positioned an electrode of an ignition plug 30 inserted obliquely downward from the right side of the engine.

The cylinder block 19 has a chain chamber 19a formed on the left side and interconnecting the interior of the crankcase 22 and the interior of the cylinder head 20. A timing chain 34 placed in the chain chamber 11a drives a camshaft 31 that drives to open and close an intake valve 32 and an exhaust valve 33 with the crankshaft 28.

In the cylinder bore of the cylinder block 19 is inserted a piston 26 for free sliding therein. The piston 26 is connected to the small end 27b of a connecting rod 27. The connecting rod 27, at its big end 27a, is connected to a crankpin 29 forcibly inserted between right and left crank arms 28a and 28b of the crankshaft 28 through a needle bearing.

A transmission shaft 47 is placed behind and parallel to the crankshaft 28. An output shaft 48 is placed coaxially and to the left of the transmission shaft 47. The output shaft 48, at its left end protruding out of the crankcase, is provided with a drive sprocket 49 linked through a chain 50 with a driven sprocket 51 on the rear wheel 7.

A generator 42 is attached to the left end of the crankshaft 28 located on the opposite side of the transmission case 45. The generator 42 is constituted with a sleeve 43 taper-fitted onto the crankshaft 29, a rotor 42a secured to the sleeve 43, and a stator 42b in a position radially opposite the rotor 42a and secured to a boss portion 42c coaxially with the crankshaft of the generator case 44.

The crankcase 22 is split into the first case 40 on the left side in the crankshaft direction and the second case 41 on the right side. The generator case 44 for housing the generator 42 is removably attached to the left side, in the crankshaft direction, of the first case 40. The transmission case 45 serving to house the CVT 16 is attached to the right side, in the crankshaft direction, of the second case 41.

The parting line B of the first and second cases 40 and 41 is slightly displaced to the left of the cylinder axis A (engine center line). The first and second cases 40 and 41 are constituted, in rough description, with first and second peripheral walls 40a and 41a that are generally open toward outside in the crankshaft direction, on the inner side of which are integrally formed first and second support walls 40b and 41b that support the crankshaft 28.

The first support wall 40b of the first case 40 has a left journal support wall portion 40c for supporting, through a left side journal bearing 35, the left crank journal portion 28c of the crankshaft 28, and a reduction gear mechanism support wall portion 40d formed to project in a stepped manner a small amount to the left in the crankshaft direction relative to the left journal support wall portion 40c.

The second support wall 41b of the second case 41 has a right journal support wall portion 41c for supporting the right crank journal portion 28d of the crankshaft 28 through a right side journal bearing 36, and a clutch support wall portion 41d formed to project in a stepped manner to the left in the crankshaft direction relative to the right journal support wall portion 41c.

The crank arms 28a, 28b, and the crank pin 29 of the crankshaft 28 are housed in the crank chamber 37 formed with the left and right journal crank support wall portions 40c and 41c.

The centrifugal clutch mechanism 17 is housed in a clutch chamber 38 formed with the second peripheral wall 41a and the clutch support wall portion 41d. The clutch chamber 38 is separated from the crank chamber 37 and communicates with the crank chamber 37 through an opening 103 described later.

A reduction chamber 39 is formed with the reduction gear mechanism support wall portion 40d and the clutch support wall portion 41d to house the reduction gear mechanism 18, and directly communicates with the crank chamber 37 without separation.

The reduction gear mechanism 18 is constituted as follows: A reduction shaft 52 is provided parallel to the transmission shaft 47 between the support wall portions 40d and 41d. The right side portion of the reduction shaft 52 is supported through a reduction shaft bearing 53 with the clutch support wall portion 41d while its left side portion is supported through a reduction shaft bearing 54 with a recess 40e formed in the reduction gear mechanism support wall portion 40d. A primary reduction small gear 74 capable of making a relative rotation is attached to the transmission shaft 47 placed in the clutch chamber 38. A primary reduction large gear 75 engaged with the primary reduction small gear 74 is secured with a key to the reduction shaft 52. The reduction shaft 52 located in the reduction chamber 39 is integrally formed with a secondary reduction small gear 52a. A secondary reduction large gear 48a engaged with the secondary reduction small gear 52a is integrally formed with the output shaft 48.

The output shaft 48 is placed coaxially with the transmission shaft 47. The right end portion of the output shaft 48 is disposed with a support hole 48b in a depressed manner into which the left end portion of the transmission shaft 47 is to be inserted. The right end portion of the output shaft 48 is supported with the left end portion of the transmission shaft 47 through a bearing 76 attached in the support hole 48b. The left end portion of the output shaft 48 is passed through and supported with the reduction gear mechanism support wall portion 40d of the first case 40 through a bearing 77. The drive sprocket 49 is secured to the projecting end portion of the output shaft 48.

The CVT 16 is constituted with the drive pulley 55 attached to the right outside end portion of the crankshaft 28, the driven pulley 56 attached to the right outside end of the transmission shaft 47, and the V-belt 57 routed around both the drive pulley and the driven pulley to be connected to each other.

The V-belt 57 is made of resin that is heat resistant and durable. Details of the constitution are as follows. A large number of resin blocks 57a, made of a material such as polyamide resin mixed with carbon fibers or aramid fibers and formed in the shape of the letter "H" lying on its side, are placed in succession and joined together by fitting pairs of ring-shaped connecting members 57b made of highly heat resistant rubber thereonto.

The drive pulley 55 is made up of a fixed pulley half 55a and a movable pulley half 55b, with the former fixed to the right end portion of the crankshaft 28 while the latter placed on the inner side, in the crankshaft direction, of the fixed pulley half 55a, arranged to be axially slidable and rotatable together with the crankshaft 28 through a slide collar 59. A cam plate 58 and the slide collar 59 are spline-fitted onto the right end portion of the crankshaft 28, on the axially outer side of which is attached the fixed pulley half 55a and secured by means of a locking nut 60. Cylindrical weights 61 are placed between the movable pulley half 55b and the cam plate 58. As the crankshaft 28 rotates faster, the weights 61 move radially outward by centrifugal force to move the movable pulley half 55b axially outward and increase the routing radius of the pulley. As a result, the reduction ratio decreases.

The driven pulley 56 is made up of a fixed pulley half 56a and a movable pulley half 56b, with the former fixed to the right outside end portion of the transmission shaft 47 while the latter placed on the outer side, in the crankshaft direction, of the fixed pulley half 56a, to be axially slidable. A cylindrical slide collar 62 secured to the axially central portion of the fixed pulley half 56a is spline-fitted onto the transmission shaft 47. A cylindrical boss member 63 secured to the axially central portion of the movable pulley half 56b is fitted, to be axially movable, onto the slide collar 62. Guide pins 64 planted into the slide collar 62 engage with slide grooves 63a formed in the boss member 63 so that the guide pins 64 can slide and the movable pulley half 56b can rotate together with the fixed pulley half 56a.

At the fore-end portion of the slide collar 62 is attached a spring receiving member 65 of an annular plate shape by means of a retaining ring 65a. A coil spring 67 for constantly urging the movable pulley half 56b toward the fixed pulley half 56a is interposed between the spring receiving member 65 and the movable pulley half 56b.

The driven pulley 56 is pushed into a position recessed from the fore-end portion 62a of the slide collar 62 and secured to the transmission shaft 47 by means of a locking nut 66 screwed to the fore-end 47a of the transmission shaft 47.

Here, the inside diameter of the slide collar 62 is stepped to a diameter larger than the outside diameter of the transmission shaft 47, and the fore-end portion 47a of the transmission shaft 47 is stepped to a smaller diameter. The locking nut 66 and the washer 66a can be placed smoothly in the slide collar 62. In this way, it is possible to place the locking nut 66 toward the inner side in the crankshaft direction from the spring receiving member 65 for the coil spring 67. Since this embodiment is arranged that the movable pulley half 56b of the driven pulley 56 attached to the transmission shaft 47 is located on the outer side in the crankshaft direction of the fixed pulley half 56a, it is possible to secure a free space on the inner side of the driven pulley 56 of the transmission shaft 47 and use the space for placing the centrifugal clutch mechanism 17 adjacent to the fixed pulley half 56a. This makes it possible to coaxially place the output shaft 48 on part of the transmission shaft 47 located on the opposite side of the driven pulley 56 without increasing the engine width. As a result, unlike the conventional arrangement of placing the output shaft behind the transmission shaft, the engine size can be reduced in the longitudinal direction of the vehicle.

Since this embodiment is arranged that the locking nut 66 is placed in an axially recessed position using the spring receiving member 65 that supports the coil spring 67 for urging the movable pulley half 56b against the fixed pulley half 56a, it is possible to restrict the dimension of the engine from increasing in the vehicle width direction by reducing the amount of protrusion of the coil spring 67 toward the outer side in the transmission shaft direction with a simple constitution while securing a necessary length of the coil spring 67.

Figure 17:
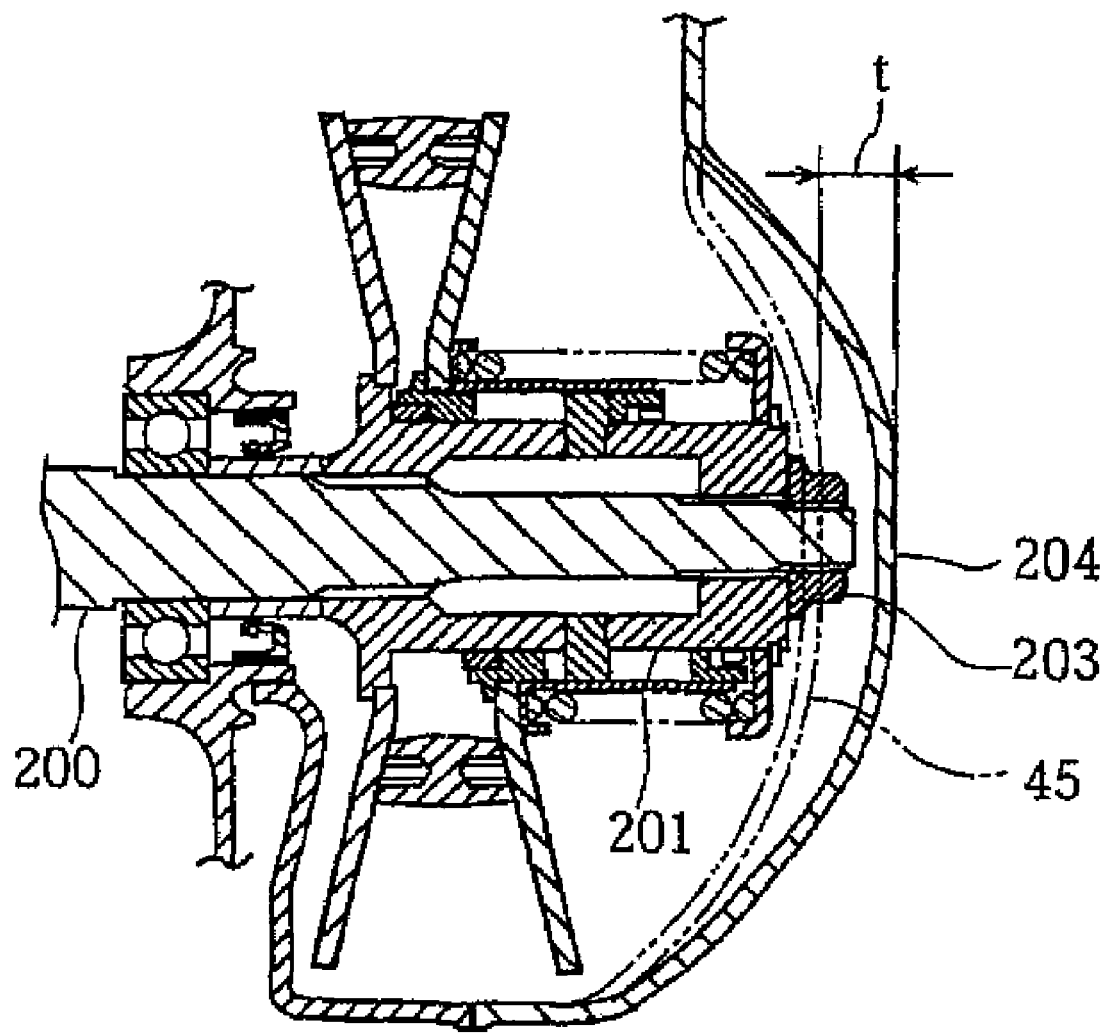
FIG. 17 is a sectional view of the conventional driven pulley generally in use.

In other words, in a constitution for example shown in FIG. 17 in which a slide collar 201 is secured to a transmission shaft 200 by tightening a locking nut 203 on the outside end surface of the slide collar 201, a transmission case 204 protrudes outward in the vehicle width direction according to the size of the locking nut 203. In contrast to the above, this embodiment is arranged that the locking nut 66 is placed in an axially recessed position from the outside end of the spring receiving member 65, so that the protrusion of the transmission case 45 is reduced by a dimension of (t), about 10 mm.

Since the coil spring 67 is located on the axially outer side, the coil spring 67 can be serviced easily after only removing the retaining ring 65a. If the movable pulley half were placed inside the fixed pulley half, or if the coil spring were placed axially on the inner side, servicing work efficiency would become poor because the entire driven pulley would have to be removed.

The transmission case 45 is constituted to be generally sealed and formed to be separate from or independent of the crankcase 22 in an elliptic shape as seen from the right (FIG. 4) so as to cover most of the upper side of the crankcase 22. The transmission case 45 is constituted with a case 45a of a bottomed box shape that is open toward the outer side in the crankshaft direction, and a lid 45b that closes the opening in an airtight state, and is secured to the second case 41 using bolts 70. The case 45a is made of molded resin and the lid 45b is made of cast aluminum alloy.

A space (a) is formed between the bottom wall 45c of the case 45a and the second case 41 and restricts the heat of the engine 2 from being transmitted to the transmission case 45. Further, since the case 45a is made of a molded resin, heat from the engine 2 can be restricted from being transmitted to the transmission case 45 in terms thereof.

On the outer side in the crankshaft direction of the second peripheral wall 41a forming the clutch chamber 38 is formed an opening 41e of the size that permits the centrifugal clutch mechanism 17 to be put in and taken out. A clutch cover 71 is attached in an oil-tight state to the opening 41e. The clutch cover 71 is removably fixed to the opening edge of the second peripheral wall 41a by means of bolts 72. In this way, the transmission case 45 can be removed together with the driven pulley 56, and the centrifugal clutch mechanism 17 can be removed together with the transmission shaft 47 after removing the clutch cover 71.

The centrifugal clutch mechanism 17 is positioned and supported to be axially immovable with clutch bearings 80 on one side and 81 on the other side, with the former attached to the axially left end and the latter in the center of the transmission shaft 47. The clutch bearing 80 on one side is supported with the clutch support wall portion 41d. The clutch bearing 81 on the other side is supported with the clutch cover 71.

The clutch support wall portion 41d that supports the clutch bearing 80 and the reduction shaft bearing 53 is displaced toward the left of the second crank support wall portion 41c that supports the right hand journal bearing 36. In other words, it is located between the first crank support wall portion 40c that supports the left journal bearing 35 and the second crank support wall portion 41c. More concretely, it is located on the cylinder axis A or slightly displaced from the cylinder axis A toward the parting line B.

The clutch cover 71 that supports the clutch bearing 81 on the other side is located more on the right outer side in the crankshaft direction than the second crank support wall portion 41b that supports the right journal bearing 36. The reduction gear mechanism support wall portion 40d that supports the left side bearing 77 of the output shaft 48 is located more on the left outer side than the first crank support wall portion 40c that supports the left journal bearing 35.

According to the present embodiment, it is possible to enhance the heat resistance and durability of the belt in comparison with a rubber belt by making the V-belt 57 routed around the drive pulley 55 and the driven pulley 56 with a resin member, so that the V-belt 57 requires no cooling. As a result, the transmission case 45 can be made in a sealed constitution to prevent water and dust from entering inside.

Using the resinous belt 57 with enhanced durability makes it possible to reduce the outside diameters of the drive pulley 55 and the driven pulley 56, and accordingly, the distance between axes of the drive pulley 55 and the driven pulley 56 so that the engine as a whole is made compact.

In this embodiment, the transmission case 45 is made in a sealed constitution separate from or independent of the crankcase 22. Therefore, the space (a) provided between the crankcase 22 and the transmission case 45 blocks engine heat, preventing heat of the engine 2 from being transmitted to the transmission case 45 and restricting temperature rise in the belt chamber.

The crankcase 22 is parted in the crankshaft direction into the first and second cases 40 and 41. The transmission case 45 is placed on the outer side in the crankshaft direction of the second case 41. The centrifugal clutch mechanism 17 is located in the vicinity on the inner side in the crankshaft direction of the transmission case 45. As a result, it is possible to place the output shaft 48 coaxially with the transmission shaft 47 on the opposite side of the CVT 16 to reduce the longitudinal dimension of the engine 2 while restricting its width dimension.

Since the centrifugal clutch mechanism 17 is supported at two points with one and the other clutch bearings 80 and 81 attached to the transmission shaft 47, the centrifugal clutch mechanism 17 is positioned in the axial direction and supported with a simple constitution without using separate components.

This embodiment is arranged that the clutch support wall portion 41d that supports the clutch bearing 80 on one side is placed between the first and second crank support wall portions 40c and 41c that support the left and right journal bearings 35 and 36 of the crankshaft 28 and the clutch cover 71 (wall for supporting the other side of the clutch) that supports the clutch bearing 81 on the other side is located on the outer side in the crankshaft direction of the second crank support wall portion 41c that supports the right journal bearing 36. Therefore, it is possible to secure the capacity of the clutch chamber 38 while reducing the distance between axes of the crankshaft 28 and the transmission shaft 47 in comparison with an arrangement in which the first crank support wall 40c and the clutch support wall 41 on one side are located on the same line, and the second crank support wall 41c and the clutch cover 71 are located on the same line, so that the centrifugal clutch mechanism 17 is housed compactly and the engine as a whole is made compact.

Since the clutch cover 71 is removably attached to the opening 41e of the second case 41, the work of maintenance and replacing parts can be made easily because the centrifugal clutch 17 can be removed together with the transmission shaft 47 after the transmission case 45 and the clutch cover 71 are removed.

In this embodiment, the output shaft 48 is located coaxially on the side, opposite the transmission case 45, of the transmission shaft 47, and the drive sprocket 49 is attached to the output shaft 48. Owing to this, it is possible to place coaxially the centrifugal clutch mechanism 17 and the drive sprocket 49 to reduce the engine size in the longitudinal direction of the vehicle.

The centrifugal clutch mechanism 17 is located near the inner side in the crankshaft direction of the driven pulley 56. To put it more concretely, the clutch mechanism 17 around the opening of a cup-shape outer clutch 83 is disposed to overlap in the crankshaft direction with the right crank arm 28b of the crankshaft 28.

The centrifugal clutch mechanism 17 is of a wet, multiple plate type, as mainly shown in FIGS. 12 to 15, constituted in the rough description as follows: The boss 83b of the outer clutch 83 is spline-fitted onto the transmission shaft 47 to rotate together. An inner clutch 84 is coaxially placed on the axially inner side of the outer clutch 83. The hub portion 84a of the inner clutch 84 is spline-fitted onto the primary reduction small gear 74 to rotate together. Incidentally, the primary reduction small gear 74 is rotatably attached to the transmission shaft 47.

A plural number of outer clutch plates 85 are placed in the outer clutch 83 and on both sides of them are placed two pressing plates 86 and 86. Those components 85 and 86 are engaged with the outer clutch 83 so as to rotate together. Inner clutch plates 87 are placed among the outer clutch plates 85 and the pressing plates 86. The inner clutch plates 87 are engaged with the outer periphery of the inner clutch 84 so as to rotate together.

A cam surface 83a is formed inside the outer clutch 83 and weights 88 are placed between the cam surface 83a and the pressing plates 86 located on the outer side. As centrifugal force works on the weights 88, they are moved toward the left and radially outward of the outer clutch 83 in FIG. 12 (in the clutch engagement direction) to press and move the pressing plates 86 and make the outer and inner clutch plates 85 and 86 engage with each other. Incidentally, the upper half of FIG. 12 shows the centrifugal clutch mechanism 17 in the disengaged state and the lower half shows the engaged state.

The centrifugal clutch mechanism 17 is provided with a clutch plate anti-stick mechanism 90. The clutch plate anti-stick mechanism 90 is constituted with plate springs 91 interposed between the outer clutch plates 85, and between the outer clutch plates 85 and the pressing plates 86 to urge the outer clutch plates 85 and the pressing plates 86 in the direction of parting from each other.

To prevent the inner clutch plates 87 from moving in the axial direction, pins 92 are passed through the inner clutch plates 87 at circumferential intervals. Coil springs 93 are placed among the inner clutch plates 87 to urge them in the direction of parting from each other.

In the centrifugal clutch mechanism 17 of this embodiment, the weights 88 move radially outward by centrifugal force as the engine revolution increases, and their axial positions are determined with the cam surface 83a. When the engine revolution exceeds a predetermined value by the opening operation of the throttle (not shown), the weights 88 press and move the pressing plates 86, and press together the outer and inner clutch plates 85 and 87. Then the engine revolution is transmitted from the transmission shaft 47 through the reduction gear mechanism 18 to the output shaft 48. The rotation of the output shaft 48 causes the rear wheel 7 to rotate through the drive sprocket 49 and the chain 50.

As the throttle is operated to close and the engine revolution decreases, the weights 88 move radially inward. When the engine revolution falls below a predetermined value, a pressing force of the weights 88 is released, the outer and inner clutch plates 85 and 87 make relative rotation, and the engine revolution is disengaged between the transmission shaft 47 and the output shaft 48.

As the clutch disengages and the pressing force is released, the outer clutch plates 85 and the pressing plates 86 separate from each other with the repulsive force of the plate springs 91, and the inner clutch plates 87 part from each other with the repulsive force of the coil springs 93.

In this way, the outer and inner clutch plates 85 and 87 are prevented from sticking to each other due to a lubricant oil and the clutch is prevented from dragging.

Since pins 92 prevent the inner clutch plates 87 from moving in the axial direction, the inner clutch plates 87 are prevented from tilting when the clutch is disengaged, which also helps prevent the clutch from dragging.

Next will be described the lubricant oil system of the engine 2.

The lubricant oil system is arranged such that the lubricant oil in the lubricant oil chamber 95 formed at the bottom portion 22a of the crankcase 22 is drawn up and pressure-fed with an oil pump 96 to the bearings of the crankshaft 28, camshaft 31, and other sliding parts to be lubricated, and allowed to freely fall and return to the lubricant oil chamber 95.

The lubricant oil chamber 95 is positioned below the crank chamber 37 and provided with a swell portion 22b swelling toward the right side of the engine. The swell portion 22b is located below the transmission case 45, and between the swell portion 22b and the transmission case 45 is formed a gap (c). The space (a) between the transmission case 45 and the crankcase 22 connects to the outside through the gap (c).

Thus, according to the embodiment, since the swell portion 22b is formed swelling toward the underside of the transmission case 45, the center (D) of the lubricant oil chamber 95 as a whole is disposed to be shifted toward the right side in the crankshaft direction. The inside wall 22c of the lubricant oil chamber 95 constituting the side wall opposite the transmission case is approximately in the same position, in the crankshaft direction, as the left journal support wall 40c for supporting the left side journal bearing 35 of the crankshaft 28.

The oil pump 96, as shown principally in FIG. 11, is placed on the inner surface 22c of the lubricant oil chamber 95. The oil pump 96 is positioned between the left journal support wall 40c and the generator 42, in the crankshaft direction. The oil pump 96 includes a pump shaft 96a supported with a housing 97 having a suction port 97a and a discharge port 97b, and a pump gear 98 attached to the outside end portion of the pump shaft 96a.

A suction passage 40f communicating with the suction port 97a is formed in the first case 40 and made open through an oil strainer 99 at the bottom surface in the lubricant oil chamber 95. A lubricant oil supply passage 40g communicating with the discharge port 97b is formed also in the first case 40 and made to communicate through an oil filter 100 with a main supply passage 44a formed in the generator case 44. The downstream end of the main supply passage 44a is connected to an oil chamber 44c communicating with the left end surface of the crankshaft 28.

An oil passage 28e communicating with the oil chamber 44c is formed axially in the crankshaft 28 and made open, through a branch passage 29a formed in the crankpin 29, to a connecting bearing portion 101 where the crankpin 29 and the connecting rod 27 are interconnected.

The oil filter 100 is constituted that an element 100b is housed in a filter chamber 100a disposed in the generator case 44 in a depressed manner and the filter chamber 100a is removably covered with a filter cover 100c. The filter chamber 100b is formed to overlap, in the crankshaft direction, with the generator 42 and the filter cover 100c is approximately in the same position, in the crankshaft direction, with the generator case 44.

The filter chamber 100a, as seen in the crankshaft direction, is located below the first plane C including the axes of the crankshaft 28 and the transmission shaft 47 and between the second plane E orthogonal to the first plane C and includes the axis of the crankshaft 28, and the third plane F orthogonal to the first plane C and includes the axis of the transmission shaft 47.

Furthermore, the filter chamber 100a is located below the crank chamber 37 and, as seen in the crankshaft direction, overlaps in part with the lubricant oil chamber 95.

The clutch mechanism 17 is mounted on the transmission shaft 47 so as to overlap, at least in part, in the crankshaft direction, with the right crank arm 28b of the crankshaft 28. The axis of the filter chamber 100a is disposed adjacent to, more particularly, slightly below the bottom edge of the clutch mechanism 17 and parts to the left side, in the crankshaft direction, from the clutch mechanism 17. A reference numeral 44d shows an oil level check window for checking if the lubricant oil level is between MAX to MIN.

The lubricant oil drawn up with the oil pump 96 is pressure-fed to the oil passage 28e through the supply passage 40g, the oil filter 100, and the main supply passage 44a and then from the oil passage 28e to the connecting bearing portion 101 through the branch passage 29a. The lubricant oil supplied to the connecting bearing portion 101 is spread with oil feeding pressure and centrifugal force of the crankshaft 2B within the crank chamber 37. Part of the spread lubricant oil enters the reduction chamber 39 to lubricate the secondary reduction small gear 52a and secondary reduction large gear 48a and falls into the lubricant oil chamber 95.

According to the embodiment, since the bottom portion 22a of the crankcase 22 is formed with the swell portion 22b swelling toward the underside of the transmission case 45, the free space under the transmission case 45 is effectively used to increase the amount of lubricant oil in the lubricant oil chamber 95. Therefore, unlike the arrangement in which the depth of the case bottom is increased to secure the amount of lubricant oil, the height of the engine 2 does not need to be increased.

Since the bottom portion 22a of the crankcase 22 is made to swell out toward the underside of the transmission case 45, the surface area of the lubricant oil chamber 95 is increased, so that the cooling property is improved accordingly and the weight balance of the engine as a whole is improved.

Here, since this embodiment is arranged that the V-belt is made of a resin member and the transmission case 45 is made to be independent of the crankcase 22, heat resistance and durability of the V-belt are enhanced in comparison with an arrangement using a rubber belt, and the thermal effect from the engine is restricted. As a result, it is possible to reduce the diameters of the drive pulley 55 and the driven pulley 56, and the size of the transmission case 45. This makes it possible to produce a free space under the transmission case 45 and accordingly form the swell portion, and increase the lubricant oil capacity.

In this embodiment, since the filter chamber 100a is disposed in a depressed manner on the side surface of the generator case 44 opposite the transmission case 45 so as to overlap, in the crankshaft direction, with the generator 42, it is possible to dispose the oil filter 100 without protruding from the engine case 44 and to eliminate the problem of engine width increase due to the disposition of the oil filter 100 while the transmission case 45 is provided.

The filter chamber 100a is located below the first plane C including the axes of the crankshaft 28 and the transmission shaft 47 and between the second plane E orthogonal to the first plane C and includes the axis of the crankshaft 28, and the third plane F orthogonal to the first plane C and includes the axis of the transmission shaft 47. Therefore, it is possible to secure a space for the filter chamber 100a to be disposed in a depressed manner on the generator case 44 opposite the transmission case 45 and to dispose the oil filter 100 without protruding from the generator case 44.

Furthermore, since the clutch mechanism 17 is placed from the generator case 44 toward the inner side in the crankshaft direction, and since the filter chamber 100a is placed so that the axis is located below the bottom edge of the clutch mechanism 17, it is possible to more reliably secure a space for disposing the filter chamber 100a and to dispose the oil filter 100 without protruding from the side surface of the generator case 44.

Since the exhaust pipe 24 extends toward the rear of the vehicle body along the transmission case 45 and the lateral side of the lubricant oil chamber 95, it is possible to place the exhaust pipe 24 without interfering with the filter chamber 100a placed opposite the transmission case 45 and to ensure ease of maintenance including replacement of the oil filter 100.

Furthermore, since the lubricant oil chamber 95 is disposed below the crank chamber and shifted to the side of the transmission case 45, it is possible to place the filter chamber 100a overlapping with at least a part of the lubricant oil chamber 95, as seen in the crankshaft direction, and to secure a space for disposing the filter chamber 100a.

Next will be described the constitution of lubricating the centrifugal clutch mechanism 17.

As shown in FIGS. 3 and 7, part of the centrifugal clutch mechanism 17 is located in the area, as seen in the direction at right angles to the crankshaft, where lubricant oil is spread from the connecting bearing portion 101 of the connecting rod 27 and the crankpin 29. That is to say, the outer and inner clutch plates 85 and 87 of the centrifugal clutch mechanism 17 are located to face the crank chamber 37.

A lead-in opening 103 for leading the lubricant oil spread from the connecting bearing portion 101 into the clutch chamber 38 is formed in the second peripheral wall 41a that defines the crank chamber 37 and the clutch chamber 38.

The clutch support wall portion 41d is integrally formed with a guide portion 104 extending inward of the clutch chamber 38. The guide portion 104 is located on the extension of the line interconnecting the crankshaft 28 and the transmission shaft 47 and includes a lubricant oil receiving portion 104a extending vertically so as to generally face the lead-in opening 103 and a guide portion 104b continuously extending in an arcuate shape from the lower end of the lubricant oil receiving portion 104a toward the underside of the transmission shaft 47. The guide portion 104b is located as inserted into the truncated-cone-shaped boss portion of the inner clutch 84.

With the above arrangement, the lubricant oil entering through the lead-in opening 103 is received with the guide portion 104, guided more to the inner side than to the outer side of the centrifugal clutch mechanism 17, supplied by centrifugal force of the centrifugal clutch mechanism 17 between the outer and inner clutch plates 85 and 87, and supplied to the engaging area of the primary reduction large and small gears 75 and 74 (as shown with arrows in FIGS. 3 and 7).

The centrifugal clutch mechanism lubricating structure of the present embodiment is arranged that the lubricant oil supplied to the connecting bearing portion 101 of the crankpin 29 and the connecting rod big end 27a is led to the centrifugal clutch mechanism 17. Therefore, it is possible to supply a large amount of lubricant oil that is spread from the connecting bearing portion 101 to the centrifugal clutch mechanism 17 to prevent the outer and inner clutch plates 85 and 87 from being seized by heat without employing a special lubrication oil passage.

This embodiment makes it possible to lead the lubricant oil from the crank chamber 37 effectively into the clutch chamber 38 with a very simple constitution since the centrifugal clutch mechanism 17 is located, as seen in the direction at right angles to the crankshaft, in the area over which the lubricant oil from the connecting bearing portion 101 is spread, and the lead-in opening 103 for permitting the entry of lubricant oil is formed in the second peripheral wall 41a that defines the clutch chamber 38 and the crank chamber 37.

This embodiment is arranged that the clutch support wall portion 41d is integrally formed with a guide portion 104 extending to the inward of the clutch chamber 38. The guide portion 104 is located on the extension of the line interconnecting the crankshaft 28 and the transmission shaft 47 and includes a lubricant oil receiving portion 104a extending vertically so as to generally face the lead-in opening 103 and a guide portion 104b continuously extending in an arcuate shape from the lower end of the lubricant oil receiving portion 104a toward the underside of the transmission shaft 47. Therefore, lubricant oil is supplied more securely to the outer and inner clutch plates 85 and 87.

Next will be described the series of kick gears and of starting gears respectively for transmitting a rotation force from the kick type starting system and the motor type starting system, and the series of pump gears and of balancer gears respectively for transmitting rotation of the crankshaft to the oil pump and the balancer shaft.

As mainly shown in FIGS. 5, 9, and 10, a kick shaft 110 is placed parallel to and nearly vertically below the output shaft 48. The kick shaft 110, as seen in the crankshaft direction, is located to overlap with at least a part of both the clutch mechanism 17 and the driven pulley 56.

The kick shaft 110 is journal-supported at the portion inside the drive sprocket 49 with the boss portion 40h of the first case 40 and at the outside portion with the boss portion 44b integrally formed with the generator case 44.

A kick arm 111 is attached to the outside end portion of the kick shaft 110 and a kick gear 112 is spline-fitted to be axially slidable onto the inside end portion of the kick shaft 110. The kick gear 112 is located inside the first case 40. A return spring 113 is wound around the inside end portion of the kick shaft 110 to urge the kick shaft 110 toward the starting position.

A main intermediate shaft 114 and a sub-intermediate shaft 115 are placed between the kick shaft 110 and the crankshaft 28 and parallel to the kick shaft 110. The main intermediate shaft 114 extends between the first and second cases 40 and 41 and journal-supported with them. A main intermediate gear 116 capable of engaging with the kick gear 112 is attached to the main intermediate shaft 114.

The sub-intermediate shaft 115 is journal-supported with the bearing portion 40j formed in the first case 40. The inside and outside ends of the sub-intermediate shaft 115 project respectively inward and outward of the first case 40. A first intermediate gear 115a for engaging with the main intermediate gear 116 is integrally formed inside the case of the sub-intermediate shaft 115 and a second intermediate gear 117 is attached outside the case. The second intermediate gear 117 engages with a first crank gear 121 which will be described later.

In this way, the series of kick gears for transmitting rotation of the kick shaft 110 to the crankshaft 28 is constituted with the kick gear 112, the main intermediate gear 116, the first intermediate gear 115a, and the second intermediate gear 117. The series of kick gears is located between the first support wall portion 40b for supporting the left journal bearing 35 and the generator 42.

The kick gear 112, the main intermediate gear 116, and the first intermediate gear 115a are located in a position that communicates with the lubricant oil chamber 95 inside the first case 40. The second intermediate gear 117, the first crank gear 121, and the cam sprocket 122 are located outside the first case 40.

As the kick arm 111 is kicked down, the kick shaft 110 rotates, the kick gear 112 moves axially and engages with the main intermediate gear 116 to transmit the rotation to the first crank gear 121 through the first and second intermediate gears 115a and 117 and rotate the crankshaft 28.

Part of the crankshaft 28 between the left journal bearing 35 and the sleeve 43 of the generator 42 is provided with a one-way clutch 120, the first crank gear 121, and a cam sprocket 122 in that order from the outer side.

The one-way clutch 120 is provided with a starting gear 120a connected through an idler gear 124 to a drive gear 125a of a starter motor 125. The starter motor 125, with its motor axis parallel to the crankshaft 28, is secured to the front wall of the crankcase 22.

The series of starting gears for transmitting rotation of the starter motor 125 to the crankshaft 28 is constituted with the drive gear 125a, the idler gear 124, and the starting gear 120a. The series of starting gears is located between the support wall for supporting the right journal bearing 35 and the generator 42.

Since the kick mechanism of this embodiment is arranged that the kick gear 112, the main intermediate gear 116, and the first intermediate gear 115a are located in the position that communicates with the lubricant oil chamber 95, engaging parts of those gears are sufficiently lubricated.

Since the sub-intermediate shaft 115 is made to pass through the first case 40 from the inside to the outside to transmit the rotation of the kick shaft 110 from the inner side of the sub-intermediate shaft 115 to the outer side, and from the second intermediate gear 117 on the outer side to the crankshaft 28 through the first crank gear 121, it is possible to locate the first crank gear 121 on the outer side rather than the crank journal portion 28c, to reduce the distance between the crankshaft bearings 35 and 36, and to journal-support the crankshaft 28 while reducing the bending moment due to the connecting rod 27. It is also possible to secure the layout space for the cam sprocket 122 and the second crank gear 127 to facilitate the layout around the crankshaft. In other words, if it were arranged that the rotation of the kick shaft 110 is transmitted to the crankshaft 28 within the first case 40, a gear would be required between the left crankshaft bearing 35 and the left crank arm 28a, the distance between the left and right bearings 35 and 36 would increase to the disadvantage of the bending moment mentioned above.

Since this embodiment is arranged that the kick shaft 110 is located nearly vertically below the output shaft 48, the kick arm 111 is easy to kick down and the size of the engine 2 can be reduced in the longitudinal direction of the vehicle.

Part of the kick shaft 110 on the inner side in the vehicle width direction of the rear wheel drive sprocket 49 is journal-supported with the first clutch support wall portion 40d, part of it on the outer side in the vehicle width direction is journal-supported with the generator case 44, and the kick arm 111 is attached to part of the kick shaft 111 projecting to the outer side of the kick shaft 110 rather than the generator case 44. Therefore, it is possible to place the kick shaft 110 and the kick arm 111 in positions for kicking down without interfering with the rear wheel drive sprocket 49.

As shown in FIG. 4, the kick shaft 110, as seen in the crankshaft direction, is located within the axial projection area of the transmission case 45, more particularly, within the axial projection areas of the driven sprocket 56 and the centrifugal clutch mechanism 17. That is to say, it is located nearly just below the driven pulley 56.

Since the kick shaft 110 is placed on the opposite side of the transmission case 45 as described above, a space for placing the kick shaft need not be secured in the transmission case 45, so that it is possible to place the drive pulley 55 and the driven pulley 56 of the CVT 16 close to each other to the extent that only a small gap (b) (see FIG. 3) exists and accordingly the dimension of the engine 2 is reduced in the longitudinal direction of the vehicle.

Since the kick shaft 110 is placed within the area of projection in the crankshaft direction of the crankcase 45, it is possible to place the kick shaft 110 in a position that is near the crankshaft 28 and easy to kick down.

Since this embodiment is arranged that the centrifugal clutch mechanism 17 is placed in the vicinity on the inner side in the crankshaft direction of the driven pulley 56, and since the kick shaft 110 is placed in a position that is within the axial projection area of the centrifugal clutch mechanism 17 and nearly vertically below the transmission shaft 47, it is possible to utilize a free space within the projection area of the centrifugal clutch mechanism to locate the kick shaft 110 in the optimum position for kicking down and to reduce the size of the engine 2 in the vehicle's longitudinal direction.

A balancer shaft 129 is placed parallel to and rearward above the crankshaft 28. The balancer shaft 129 is journal-supported through balancer shaft bearings 130 and 131 with the first and second cases 40 and 41. The left end of the balancer shaft 129 projects outside the first case 40 and is connected to a balancer gear 132. A damping member 133 is attached to the inside circumferential surface of the balancer gear 132.

Here, the left and right crank arms 28a and 28b of the crankshaft 28 are located inside the balancer bearings 130 and 131, and the balancer weight 129a of the balancer shaft 129 is placed between the left and right crank arms 28a and 28b and near the crankshaft 28 so as to be superposed on the rotary locus of the crankpin 29. This makes the area around the balancer shaft compact.

The crankshaft 28 is press-fit into the first crank gear (first drive gear) 121 to which is attached a second crank gear (second drive gear) 127 to rotate together. The balancer gear (second driven gear) 132 engages with the second, crank gear 127. That is to say, inside circumferential teeth 127a are formed on the inside circumferential surface of the second crank gear 127, with the inside circumferential teeth 127a engaging with the outside circumferential teeth 121a of the first crank gear 121 (see FIG. 6).

The series of balancer gears for transmitting rotation of the crankshaft 28 to the balancer gear 132 is constituted with the first crank gear 121, the second drank gear 127, and the balancer gear 132. The series of balancer gears is located between the support wall for supporting the left journal bearing 35 and the generator 42.

The pump gear (first driven gear) 98 is connected through the second intermediate gear 117 to the first crank gear 121. In this way, the first crank gear 121 and the second intermediate gear 117 are used for both kick starting and the oil pump drive. The series of pump gears for transmitting rotation of the crankshaft 28 to the oil pump 96 is constituted with the first crank gear 121, the second intermediate gear 117, and the pump gear 98. The series of pump gears is located between the support wall for supporting the left journal bearing 35 and the generator 42.

The one-way clutch 120, the first crank gear 121, and the cam sprocket 122 attached to the crankshaft 28 are held to be axially immovable between the sleeve 43 and the journal bearing 35 as a nut 123 is screwed and tightened to the left end portion of the crankshaft 28.

This embodiment is arranged that the second intermediate gear 117 engaged with the first crank gear 121 is used both for transmitting the rotation of the kick shaft 110 to the crankshaft 28 and for transmitting the rotation of the crankshaft 28 to the gear pump 98, so that it is possible to reduce the crankshaft length accordingly and make the engine compact in width.

Since the first crank gear 121 press-fitted into the crankshaft 28 engages with the inside circumferential teeth 127a of the second crank gear 127 and with the second intermediate gear 117, it is possible to secure a sufficient length of the first crank gear 121 to be press-fitted into the crankshaft 28 and reliably transmit the rotation of the crankshaft 28 to the pump gear 98 and the balancer gear 132.

In this embodiment, it is configured that the outside circumferential teeth 121a of the first crank gear 121 engage with the inside circumferential teeth 127a of the second crank gear 127 so that the second crank gear 127 can be easily assembled, and removed for the purpose of maintenance. That is, the second crank gear 127 can be easily removed from the first crank gear 121 after removing the nut 123 from the crankshaft 28 and taking out the sleeve 43 and the one-way clutch 121.

The positioning arrangement of various shafts of the engine 2 is as follows.

As seen in the crankshaft direction, the transmission shaft 47 and the output shaft 48 are behind and on the same level with the crankshaft 28. The balancer shaft 129 and the reduction shaft 52 are placed above the first plane C that includes the axes of the crankshaft 28 and the output shaft 48. The kick shaft 110, the pump shaft 96a, and the main and sub-intermediate shafts 114 and 115 are placed above the first plane C.

The kick shaft 110 is placed nearly vertically below the output shaft 48. The pump shaft 96a is placed nearly vertically below the balancer shaft 129. The main and sub-intermediate shafts 114, 115 are placed on the line interconnecting the crankshaft 28 and the kick shaft 110.

This embodiment is arranged that the balancer shaft 129 is placed above the first plane C that includes the axes of the crankshaft 28 and the output shaft 48, and the kick shaft 110 and the pump shaft 96a of the oil pump 96 are below the first plane C, so that those components are well balanced in upper and lower positions to avoid an increase in the size of the engine. That is, a locating space is formed behind the cylinder bore and above the first plane C, and the balancer shaft 129 is located in the space. Since the balancer shaft 129 rotates with a large rotation locus of the weight 129a, if the weight were dipped in lubricant oil, a large amount of horsepower would be lost as lubricant oil is stirred. With this embodiment, however, the balancer shaft 129 does not stir lubricant oil. This embodiment is also arranged such that the reduction shaft 52 is placed by utilizing the free space located above the first plane C and between the balancer shaft 129 and the output shaft 48. Although the reduction shaft 52 is placed in a high position that is less likely to be spread with lubricant oil, since lubricant oil spread from the connecting bearing portion 101 of the connecting rod of the crankshaft 28 is supplied to the reduction gear 75 and other parts, no problem occurs as to poor lubrication.

Since the kick shaft 110 is placed nearly vertically below the output shaft 48, it is possible to reduce the longitudinal size of the engine 2 and place the kick shaft 110 in a position where it is easy to kick down.

Furthermore, the lubricant oil chamber 95 is disposed to be shifted to the side of the transmission case 45 and the series of kick gears, pump gears, starting gears, and balancer gears are shifted and disposed to the opposite side of the transmission case 45 from the lubricant oil chamber 95 of the engine case. More particularly, it is placed between the first support wall portion 40b for supporting the left crank journal portion and the generator 42. Therefore, it is possible to dispose the series of gears by effectively using the space between the generator 42 and the first support wall 40b, to secure a space for disposing the series of gears, and to avoid an increase in the engine's width.

Since the lubricant oil chamber 95 is located in the area from the lower part of the crank chamber to the lower part of the transmission case, it is possible to dispose and shift the lubricant oil chamber 95 while securing a required capacity of the lubricant oil chamber 95, and to secure a space for disposing the series of gears.

Since the series of gears are disposed along the first support wall 40b for supporting the crank journal portion or between the support wall 40b and the generator 42, it is possible to dispose the filter chamber 100a on the side surface of the generator 42 opposite the transmission case and in an overlapping position with at least a part of any of the series of gears, and to dispose the oil filter 100 without the size of the engine increasing in the longitudinal and lateral directions.

According to an embodiment of the present invention, the filter chamber is disposed in a depressed manner on the side surface of the engine case opposite to the transmission case and the filter chamber overlaps, in the crankshaft direction, at least in part with the generator. Therefore, it is possible to dispose the oil filter without protruding from the engine case and to eliminate the problem of engine width increase due to the disposition of the oil filter while the transmission case is provided.

According to an embodiment of the present invention, the filter chamber is located below the first plane including the axes of the crankshaft and the transmission shaft. The filter chamber is also located between the second plane orthogonal to the first plane and including the axis of the crankshaft and the third plane orthogonal to the first plane and including the axis of the transmission shaft. Therefore, it is possible to secure a space in the engine case for disposing the filter chamber in a depressed manner opposite to the transmission case, to dispose the oil filter without protruding from the engine case, and to avoid engine width increase.

The clutch mechanism is attached to overlap at least in part with the crank arm of the crankshaft in the crankshaft direction. That is, the clutch mechanism is placed in the engine case from the opposite side of the transmission case toward the inner side in the crankshaft direction, and the axis of the filter chamber is located adjacent to the bottom edge of the clutch mechanism. Therefore, it is possible to more reliably secure a space for disposing the filter chamber, to dispose the oil filter without protruding from the side surface of the engine case, and to avoid engine width increase.

According to an embodiment of the present invention, the exhaust pipe extends toward the rear of the vehicle body along the lower part of the transmission case and the lateral side of the engine case bottom. Therefore, it is possible to place the exhaust pipe without interfering with the filter chamber placed opposite to the transmission case and to ensure ease of maintenance including replacement of the oil filter, The lubricant oil chamber is disposed below the crank chamber and shifted to the side of the transmission case. Therefore, it is possible to place the filter chamber overlapping with at least a part of the lubricant oil chamber, as seen in the crankshaft direction, to secure a space for disposing the filter chamber, and to place the oil filter without protruding from the engine case.

According to an embodiment of the present invention, the kick shaft is placed on the opposite side of the transmission case, below the transmission shaft and the output shaft in order to overlap with at least one of the driven pulley or the clutch mechanism. The kick shaft is placed to overlap with both the driven pulley and the clutch mechanism. Therefore, it is possible to reduce the distance between axes of the drive pulley and the driven pulley, and accordingly, the longitudinal dimension of the engine. Further, since the kick shaft is placed on the opposite side of the transmission case, it is possible to place the kick shaft in a position that is near the crankshaft and easy to kick down.

The kick gear and the first intermediate gear are disposed in the inner side of the support wall portion for supporting the crank journal portion on the opposite side of the transmission case and the second intermediate gear and the crank gear are disposed on the outer side of the support wall portion. Therefore, it is possible to dispose the crank gear immediately adjacent to the outer side of the crank journal portion and to avoid engine width increase due to the disposition of the series of kick gears while the transmission case is provided.

The lubricant oil chamber is disposed to be shifted to the side of the transmission case, and at least one of the series of kick gears, pump gears, starting gears, and balancer gears is disposed to be shifted to the opposite side of the transmission case from the lubricant oil chamber of the engine case. Therefore, it is possible to secure a space in the engine case on the opposite side of the transmission case for disposing the series of gears due to the shifted disposition of the lubricant oil chamber, and to avoid engine width increase.

The side wall of the lubricant oil chamber on the opposite side of the transmission case is constituted of the support wall portion for supporting the journal portion on the opposite side of the transmission case, and at least one of the series of kick gears, pump gears, starting gears, and balancer gears is disposed along the support wall portion. Therefore, it is possible to more reliably secure a space in the engine case on the opposite side of the transmission case for disposing the series of gears due to the shifted disposition of the lubricant oil chamber, and to avoid engine width increase.

According to an embodiment of the present invention, the lubricant oil chamber is located in the area from the lower part of the crank chamber of the engine case to the lower part of the transmission case. Therefore, it is possible to dispose the lubricant oil chamber to be shifted while securing the required capacity of the Lubricant oil chamber, accordingly to secure a space for disposing the series of gears, and to avoid engine width increase.

The generator is attached to the crankshaft at the opposite end of the transmission ease, and at least one of the series of kick gears, pump gears, starting gears, and balancer gears passes between the generator and the support wall portion for supporting the opposite side and is connected to the crankshaft. Therefore, it is possible to dispose the series of gears by effectively using the space between the generator and the support wall portion and to avoid increasing the longitudinal and lateral dimensions of the engine.

The series of gears are disposed along the support wall for supporting the crank journal portion or between the support wall and the generator, and the filter chamber is disposed in a depressed manner on the side surface of the engine case opposite to the transmission case so as to overlap with the generator in the crankshaft direction. Also, the filter chamber is placed to overlap with at least a part of any of the series of gears, as seen in the crankshaft direction. Therefore, it is possible, in case that the engine includes a transmission case on one side of the engine case, to dispose the filter chamber in a depressed manner without interfering with the series of gears placed opposite to the transmission case, and to dispose the oil filter without engine width increase.

According to an embodiment of the present invention, the kick gear and the first intermediate gear are disposed in the inner side of the support wall portion for supporting the opposite side, and the second intermediate gear and the crank gear are disposed on the outer side of the support wall portion for supporting the opposite side. Therefore, it is possible to dispose the crank gear immediately adjacent to the outer side of the crank journal portion and to avoid engine width increase due to the disposition of the series of kick gears while the transmission case is provided.

The lubricant oil pump is attached to the portion constituting the side wall of the lubricant oil chamber shifted to the side of the transmission case. Therefore, it is possible to place the lubricant oil pump toward the inner side in the crankshaft direction without any difficulty and to avoid engine width increase.

What is claimed is:

1. An engine comprising:
    a transmission shaft;
    a crankshaft extending in a crankshaft direction;
    a clutch mechanism attached to the transmission shaft and overlapping at least in part with the crankshaft in the crankshaft direction; and
    a filter chamber provided on an opposite side surface of a transmission case of an engine case in a depressed manner so as to overlap with at least a part of a generator in the crankshaft direction; and
    an oil filter that filters lubricating oil disposed in the filter chamber.

2. The engine of claim 1, wherein the filter chamber is located below a first plane including axes of the crankshaft and the transmission shaft.

3. The engine of claim 2, wherein the filter chamber is located between a second plane orthogonal to the first plane and including an axis of said the crankshaft and a third plane orthogonal to the first plane and including an axis of the transmission shaft.

4. The engine of claim 1, wherein an axis of the filter chamber is located adjacent to a bottom edge of the clutch mechanism, and the filter chamber is separated from the clutch mechanism in the crankshaft direction.

5. The engine of claim 1, wherein an exhaust pipe is connected to an exhaust opening of a cylinder connected to the engine case, passing below the transmission case and along a side of a bottom of the engine case to extend in a backward direction of a vehicle.

6. The engine of claim 1, wherein a lubricant oil chamber for collecting the lubricating oil is disposed below a crank chamber and shifted to a side of the transmission case, and at least a part of the filter chamber overlaps with the lubricant oil chamber as seen in the crankshaft direction.

7. The engine of claim 2, wherein an exhaust pipe is connected to an exhaust opening of a cylinder connected to the engine case, passing below the transmission case and along a side of a bottom of the engine case to extend in a backward direction of a vehicle.

8. An engine comprising:
a kick shaft placed on an opposite side of a transmission case and parallel to a crankshaft, and positioned, as seen in a crankshaft direction, below a transmission shaft and an output shaft in order to overlap with at least one of a driven pulley or a clutch mechanism,
wherein the transmission shaft and the output shaft are coaxially disposed, and the kick shaft is located approximately directly below the output shaft and overlaps with both the driven pulley and the clutch mechanism.

9. The engine of claim 8, wherein a kick gear attached to the kick shaft is capable of engaging with a first intermediate gear attached to one end of an intermediate shaft, a second intermediate gear attached to an opposite end of the intermediate shaft is capable of engaging with a crank gear attached to the crankshaft, the kick gear and the first intermediate gear are disposed in an inner side of a support wall portion for supporting a journal portion on an opposite side of the transmission case of the crankshaft, and the second intermediate gear and the crank gear are disposed on the an outer side of the support wall portion.

10. An engine comprising:
a transmission case placed on one side in a crankshaft direction of an engine center line;
a lubricant oil chamber for collecting lubricating oil, wherein a center of the lubricant oil chamber in the crankshaft direction is placed on the one side in the crankshaft direction of the engine center line; and
wherein at least one of a series of kick gears for transmitting a rotation of a kick shaft to a crankshaft, a series of pump gears for transmitting a rotation of the crankshaft to a lubricant oil pump, a series of starting gears for transmitting a rotation of a starter to the crankshaft, and a series of balancer gears for transmitting a rotation of the crankshaft to a balancer shaft is disposed to be shifted to an opposite side of the transmission case from the lubricant oil chamber of an engine case.

11. An engine comprising:
a lubricant oil chamber for collecting lubricating oil, wherein a center of the lubricant oil chamber in a crankshaft direction is disposed to be shifted to a side of a transmission case from an engine center line passing through a cylinder axis line;
wherein at least one of a series of kick gears for transmitting a rotation of a kick shaft to a crankshaft, a series of pump gears for transmitting a rotation of the crankshaft to a lubricant oil pump, a series of starting gears for transmitting a rotation of a starter to the crankshaft, and a series of balancer gears for transmitting a rotation of the crankshaft to a balancer shaft is disposed to be shifted to an opposite side of the transmission case from the lubricant oil chamber of an engine case, and
wherein a side wall of the lubricant oil chamber on the opposite side of the transmission case is constituted of a support wall portion for supporting a journal portion on the opposite side of the transmission case of the crankshaft and at least one of the series of kick gears, the series of pump gears, the series of starting gears, and the series of balancer gears is disposed along the support wall portion.

12. The engine of claim 11, wherein the lubricant oil chamber is located in an area from a lower part of a crank chamber of the engine case to a lower part of the transmission case.

13. The engine of claim 11, wherein a generator is attached to an end of the crankshaft opposite to the transmission case, and at least one of the series of kick gears, the series of pump gears, the series of starting gears, and the series of balancer gears passes between the generator and the support wall portion and is connected to the crankshaft.

14. The engine of claim 11, wherein the series of pump gears is constituted to transmit a rotation of the crank gear attached between a support wall portion of the crankshaft and a generator to a pump gear via an intermediate gear, and the pump gear is attached to a rotational shaft of a lubricant oil pump attached to the a portion of the support wall portion constituting the side wall of the lubricant oil chamber.

15. The engine of claim 11, wherein a filter chamber is disposed in a depressed manner on a side surface of the engine case opposite to the transmission case so as to overlap at least in part with a generator attached to an end of the crankshaft opposite to the transmission case, and an oil filter for filtering the lubricant oil is provided in a filter chamber.

16. The engine of claim 12, wherein the series of kick gears is constituted that a kick gear attached to the kick shaft is capable of engaging with a first intermediate gear attached to one end of an intermediate shaft, a second intermediate gear attached on an opposite end of the intermediate shaft is capable of engaging with a crank gear attached to the crankshaft, the kick gear and the first intermediate gear are disposed on an inner side of a support wall portion, and the second intermediate gear and the crank gear are disposed on an outer side of a support wall portion.

17. An engine comprising:
a lubricant oil chamber for collecting lubricating oil, wherein a center of the lubricant oil chamber in a crankshaft direction is disposed to be shifted to a side of a transmission case from an engine center line passing through a cylinder axis line;
wherein at least one of a series of kick gears for transmitting a rotation of a kick shaft to a crankshaft, a series of pump gears for transmitting a rotation of the crankshaft to a lubricant oil pump, a series of starting gears for transmitting a rotation of a starter to the crankshaft, and a series of balancer gears for transmitting a rotation of the crankshaft to a balancer shaft is disposed to be shifted to an opposite side of the transmission case from the lubricant oil chamber of an engine case, and
wherein a filter chamber is disposed in a depressed manner on a side surface of the engine case opposite to the transmission case so as to overlap at least in part with a generator attached to an end of the crankshaft opposite to the transmission case, and an oil filter for filtering the lubricant oil is provided in a filter chamber.

18. The engine of claim 17, wherein at least a part of the filter chamber overlaps with any one of the series of gears as seen in the crankshaft direction.

19. An engine comprising:
a lubricant oil chamber for collecting lubricating oil, wherein a center of the lubricant oil chamber in a crankshaft direction is disposed to be shifted to a side of a transmission case from an engine center line passing through a cylinder axis line;
wherein at least one of a series of kick gears for transmitting a rotation of a kick shaft to a crankshaft, a series of pump gears for transmitting a rotation of the crankshaft to a lubricant oil pump, a series of starting gears for transmitting a rotation of a starter to the crankshaft, and a series of balancer gears for transmitting a rotation of the crankshaft to a balancer shaft is disposed to be shifted to an opposite side of the transmission case from the lubricant oil chamber of an engine case, and wherein the series of kick gears is constituted that a kick gear attached to the kick shaft is capable of engaging with a first intermediate gear attached to one end of an intermediate shaft, a second intermediate gear attached on an opposite end of the intermediate shaft is capable of engaging with a crank gear attached to the crankshaft, the kick gear and the first intermediate gear are disposed on the an inner side of a support wall portion, and the second intermediate gear and the crank gear are disposed on an outer side of the support wall portion.

* * * * *